(12) United States Patent
Sullivan

(10) Patent No.: US 12,735,947 B2
(45) Date of Patent: Sep. 15, 2026

(54) ROBOTIC HYDRO-EXCAVATION DEVICES

(71) Applicant: Nova Dynamics, LLC, Philomath, OR (US)

(72) Inventor: Thomas Jedidiah Sullivan, Philomath, OR (US)

(73) Assignee: Nova Dynamics, LLC, Philomath, OR (US)

(*) Notice: Subject to any disclaimer, the term of this patent is extended or adjusted under 35 U.S.C. 154(b) by 0 days.

(21) Appl. No.: 18/972,721

(22) Filed: Dec. 6, 2024

(65) Prior Publication Data

US 2025/0188804 A1 Jun. 12, 2025

Related U.S. Application Data

(60) Provisional application No. 63/607,703, filed on Dec. 8, 2023.

(51) Int. Cl.

*E21B 7/18* (2006.01)
*E21B 29/06* (2006.01)
*F16L 1/032* (2006.01)

(52) U.S. Cl.

CPC ................ *E21B 7/18* (2013.01); *E21B 29/06* (2013.01); *F16L 1/032* (2013.01)

(58) Field of Classification Search

CPC ... E21B 7/08; E21B 29/06; E21B 7/18; E21B 7/061; E21B 43/29; E21B 43/17; E21B 43/34; F16L 1/032

See application file for complete search history.

(56) References Cited

U.S. PATENT DOCUMENTS 4,092,045 A * 5/1978 Sullivan .................. E21B 43/29 299/13
2008/0000694 A1* 1/2008 Butler ..................... E21B 29/06 175/67
2020/0032631 A1* 1/2020 Popov ..................... E21B 37/00
2020/0080383 A1* 3/2020 Linde ...................... E21B 7/185
2023/0036409 A1* 2/2023 Pye ......................... E21B 7/061
2023/0133889 A1* 5/2023 Pink, Jr. .................... E21B 7/18 175/424

* cited by examiner

*Primary Examiner* — Yong-Suk (Philip) Ro

(74) *Attorney, Agent, or Firm* — Kolitch Romano Dascenzo Gates LLP

(57) ABSTRACT

Hydro-excavation devices are configured to facilitate a trenchless and non-invasive method of installing a conduit underground. The hydro-excavation devices are configured to be operatively coupled to a pressurized water supply and to utilize pressurized water from the pressurized water supply to excavate a tunnel and pull a conduit into the tunnel. The hydro-excavation devices comprise a nozzle that is configured to be operatively connected to the pressurized water supply and to eject water forward of the hydro-excavation devices to excavate the tunnel. The hydro-excavation devices comprise a locomotion system that is configured to propel the hydro-excavation devices through the tunnel. The locomotion system is configured to be operated utilizing the pressurized water received from the pressurized water supply.

20 Claims, 9 Drawing Sheets

ROBOTIC HYDRO-EXCAVATION DEVICES

RELATED APPLICATION

The present application claims priority to U.S. Provisional Patent Application Ser. No. 63/607,703, filed Dec. 8, 2023, the disclosure of which is incorporated herein by reference.

FIELD

This disclosure relates to hydro-excavation devices.

BACKGROUND

Standard methods for installing underground utilities, e.g., pipes and conduits for housing water, natural gas, electric lines, and fiber optics, include open cut pipe installation and horizontal directional drilling (HDD). Open cut pipe installation requires the use of heavy machinery, such as excavators and trenchers, to cut a continuous trench in which the piping or conduit is buried. This process is destructive and is not suitable for installing utilities in urban areas that have above ground infrastructure, such as roads, fences, and sidewalks. Additionally, cutting the trench may result in damage to existing utilities already placed underground. Furthermore, the process is labor intensive and expensive.

Horizontal directional drilling (HDD) uses a trenchless method to install underground utilities. HDD utilizes a drill bit that is inserted underground parallel to the surface. The drill bit is driven from the surface and is configured to drill along a chosen path. Because the drill bit is driven from the surface, rotational power is lost as the power is translated from the surface down the length of the drill bit. As a result, there are limitations on the length of utilities that HDD can be utilized to install. For this reason, HDD is not a suitable method for laying utilities along longer utility paths. Furthermore, HDD poses hazards such as electrocution, fire, and explosions if the drill bit damages existing utilities, such as electric or gas lines already present underground.

Thus, current methods utilized for installing underground utilities are invasive, destructive, and pose hazards to both workers installing the utilities and nearby infrastructure.

SUMMARY

The present disclosure provides apparatuses and methods relating to hydro-excavation devices.

Hydro-excavation devices are configured to be operatively connected to a pressurized water supply and to excavate a tunnel. Hydro-excavation devices comprise a housing comprising a plurality of housing segments including a forward-most housing segment. Hydro-excavation devices comprise a nozzle supported by the forward-most housing segment. The nozzle is configured to be operatively connected to the pressurized water supply and to eject water forward of the hydro-excavation device to excavate the tunnel. Hydro-excavation devices further comprise a locomotion system operatively supported by the housing. The locomotion system is configured to propel the hydro-excavation device through the tunnel.

Methods of installing a conduit in an underground tunnel utilizing a hydro-excavation device comprise ejecting pressurized water forward of the hydro-excavation device to excavate the underground tunnel by eroding debris in front of the hydro-excavation device. Methods further comprise propelling the hydro-excavation device forward into the underground tunnel, while ejecting the pressurized water, and pulling the conduit behind the device into the underground tunnel, while ejecting the pressurized water and propelling the hydro-excavation device.

Features, functions, and advantages may be achieved independently in various embodiments of the present disclosure or may be combined in yet other embodiments, further details of which can be seen with reference to the following description and drawings.

DETAILED DESCRIPTION

Figure 1:
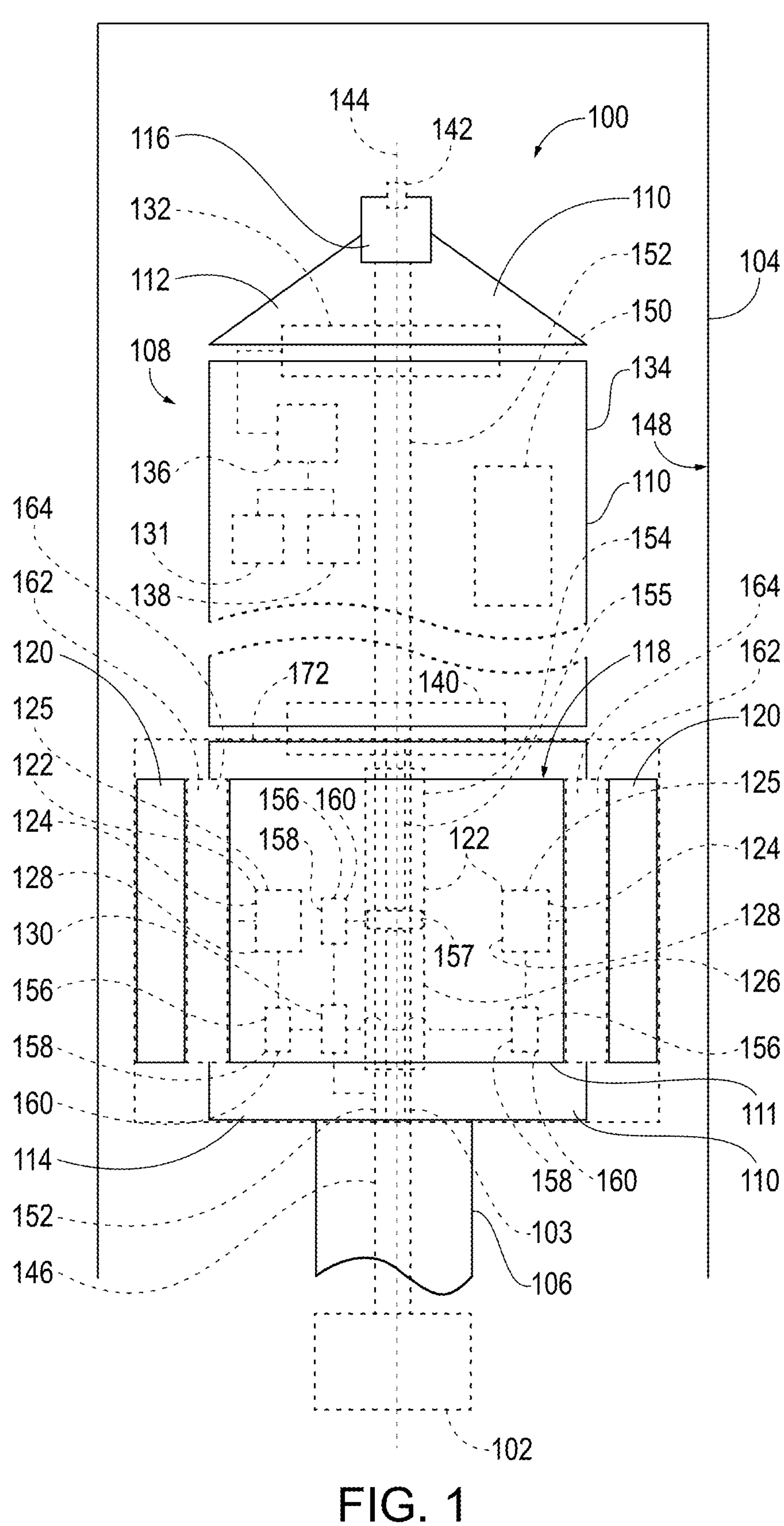
FIG. 1 is a schematic diagram representing hydro-excavation devices in accordance with aspects of the present disclosure.

FIGS. 1-8 provide examples of hydro-excavation devices 100 according to the present disclosure. FIG. 9 is a flow chart schematically representing methods 200 of laying a conduit underground using hydro-excavation devices 100 according to the present disclosure. Elements that serve a similar, or at least substantially similar, purpose are labeled with like reference numerals in FIGS. 1-9, and these elements may not be discussed in detail herein with reference to each of FIGS. 1-9. Similarly, all elements are not labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

FIG. 1 schematically represents hydro-excavation devices 100 according to the present disclosure. Generally, in FIG. 1, elements that are likely to be included in a given example are illustrated in solid lines, while elements that are optional to a given example or that correspond to a specific example are illustrated in dashed lines. However, elements that are illustrated in solid lines are not essential to all examples of the present disclosure, and an element shown in solid lines may be omitted from a particular example without departing from the scope of the present disclosure.

As shown in FIG. 1, hydro-excavation devices 100 are configured to be operatively connected to a pressurized water supply 102 and are configured to utilize pressurized water received from the pressurized water supply 102 to excavate a tunnel 104. In some examples, hydro-excavation devices 100 are configured to pull a conduit 106 into the tunnel 104. Hydro-excavation devices 100 facilitate a trenchless and non-invasive method of installing the conduit 106 underground within the tunnel 104. Additionally, by using pressurized water to excavate the tunnel 104, hydro-excavation devices 100 are configured to prevent damage to existing utilities that may be encountered underground by hydro-excavation devices 100.

The conduit 106 may comprise any suitable structure(s) configured to receive and house utilities, such as water, natural gas, electric lines, and/or communication lines such as fiber optics. For example, the conduit 106 may comprise a plastic conduit, such as high-density polyethylene (HDPE) conduit, a metal conduit, or a conduit constructed of any other suitable material, and/or may comprise one or more direct burial cables or other utility lines that are not housed within a separate conduit.

As schematically represented in FIG. 1, hydro-excavation devices 100 comprise a housing 108. The housing 108 forms a main structural frame of hydro-excavation devices 100 and is configured to house and/or support the various components of hydro-excavation devices 100. In some examples, the housing 108 comprises a plurality of housing segments 110 articulated relative to each other. In other words, each segment of the plurality of housing segments 110 is coupled to one or more of the other housing segments, such that the coupled housing segments are permitted to pivot, rotate, or otherwise articulate relative to each other. The articulation between the plurality of housing segments 110 facilitates the maneuverability of hydro-excavation devices 100 to navigate around obstacles and excavate the tunnel 104 along any desired or suitable path.

Figure 2:
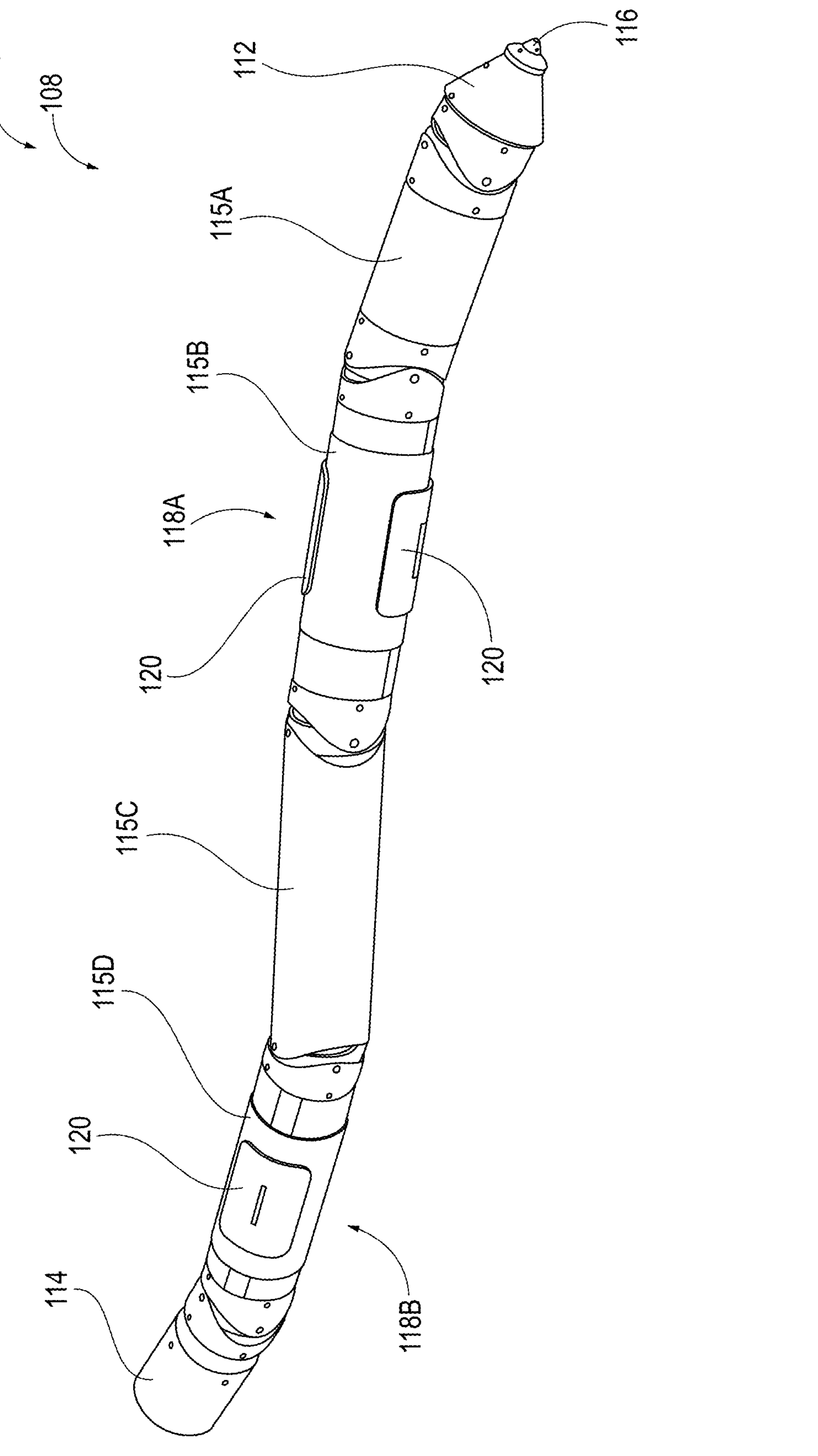
FIG. 2 is a perspective view representing an example hydro-excavation device.

As schematically represented in FIG. 1, the housing segments 110 comprise at least a forward-most housing segment 112 and a rearward-most housing segment 114. In some examples, the rearward-most housing segment 114 is configured to be selectively coupled to and decoupled from the conduit 106 to facilitate pulling the conduit 106 behind hydro-excavation devices 100 into the tunnel 104. The housing segments 110 may comprise any suitable number of housing segments disposed between the forward-most housing segment 112 and the rearward-most housing segment 114. For example, as shown in FIG. 2 illustrating a non-limiting example of hydro-excavation devices 100, hydro-excavation devices 100 may comprise four middle housing segments 115A-D positioned between the forward-most housing segment 112 and the rearward-most housing segment 114. Each housing segment 110 may house and/or support one or more components of hydro-excavation devices 100, as described below.

Hydro-excavation devices 100 comprise a nozzle 116 that is supported by the forward-most housing segment 112. The nozzle 116 is configured to be operatively connected to the pressurized water supply 102 via the housing segments 110. For example, hydro-excavation devices 100 may comprise at least one internal water supply line 152 that extends through the housing segments 110 and that is configured to operatively couple the nozzle 116 to the pressurized water supply 102. The nozzle 116 is configured to eject water received from the pressurized water supply 102 forward of hydro-excavation devices 100 to excavate the tunnel 104.

The nozzle 116 may comprise any suitable structure(s) configured to eject the water at the high pressures required to erode the underground debris and excavate the tunnel 104. In some examples, the nozzle 116 comprises one or more jets 142 each configured to eject water forward of hydro-excavation devices 100. In some examples, the nozzle 116 is configured to rotate about a longitudinal axis 144 of hydro-excavation devices 100, such that the jets 142 are rotated about the longitudinal axis 144. The nozzle 116 is configured to eject the water at high pressures, e.g., 17 MPa, to facilitate rapid erosion and displacement of debris to excavate the tunnel 104. Utilizing pressurized water to excavate the tunnel 104 facilitates rapid excavation, while preventing damage to existing utilities or piping encountered by hydro-excavation devices 100 underground.

Hydro-excavation devices 100 may be operatively coupled to the pressurized water supply 102 in any suitable manner. For example, one or more external water supply line(s) 146 may extend from the pressurized water supply 102 to the rearward-most housing segment 114 through the tunnel 104. The hydro-excavation device 100 may comprise the internal water supply line(s) 152 that extend from the rearward-most housing segment 114 to the forward-most housing segment 112 and that are in fluid communication with the external water supply line(s) 146. In some examples, the pressurized water supply 102 remains above ground and the external water supply line(s) 146 extend through the tunnel 104 to the rearward-most housing segment 114 during operative use of hydro-excavation devices 100. In some examples, the external water supply line(s) 146 extend through the conduit 106 that is being pulled by the hydro-excavation device 100 from the pressurized water supply 102 to the rearward-most housing segment 114. The water that is received from the pressurized water supply 102 into the internal water supply line(s) 152 may then be utilized by hydro-excavation devices 100 to excavate the tunnel 104 and/or to operate a locomotion system 118 of hydro-excavation devices 100 to facilitate moving hydro-excavation devices 100 through the tunnel 104, as described below.

In some examples, as shown in FIG. 1, hydro-excavation devices 100 may further include at least one vent line 103 configured to permit the removal of used water from hydro-excavation devices 100. For example, after the pressurized water is used to operate the locomotion system 118 and/or other components of hydro-excavation devices 100, the used water may be removed from hydro-excavation devices 100 to an above ground location through vent line(s) 103. In some examples, vent line(s) 103 comprise one or more connected water lines that extend from hydro-excavation devices 100 through the tunnel 104 to above ground. One or more of vent line(s) 103 may extend internally of hydro-excavation devices 100 in order to receive used water from the components of hydro-excavation devices 100 and one or more of vent line(s) 103 may extend externally to hydro-excavation devices 100 through the tunnel 104 to above ground. The used water may then be disposed of above ground or may be recycled and utilized again by the pressurized water supply 102 to operate hydro-excavation devices 100.

As schematically represented in FIG. 1, hydro-excavation devices 100 comprise the locomotion system 118 that is operatively supported by the housing 108, e.g., operatively supported by a respective housing segment 110. The locomotion system 118 is configured to propel hydro-excavation devices 100 forward through the tunnel 104. The locomotion system 118 is configured to be driven, or otherwise operated, by the water received from the pressurized water supply 102. In other words, the locomotion system 118 is configured to utilize the water that is received from the pressurized water supply 102 to propel hydro-excavation devices 100 forward through the tunnel 104.

The locomotion system 118 comprises at least one tunnel-engagement structure 120 (AKA foot) and at least one actuator 122 that is configured to translate the tunnel-engagement structure(s) 120 in a motion that facilitates propelling the device 100 forward through the tunnel 104, e.g., a stepping motion. For example, the actuator(s) 122 may be configured to translate the tunnel-engagement structure(s) 120 radially away from and toward the housing 108 between an expanded position and a contracted position, as well as linearly forward and rearward relative to the housing 108 to facilitate moving hydro-excavation devices 100 through the tunnel 104. In some examples, as schematically represented in FIG. 1, the locomotion system 118 comprises a locomotion-system housing 111. The locomotion-system housing 111 is configured to house and/or support the actuator(s) 122 and the tunnel-engagement structure(s) 120 of the locomotion system 118. In some examples, the locomotion-system housing 111 is operatively coupled to and supported by a respective one of the plurality of housing segments 110 of housing 108.

In some examples, the tunnel-engagement structure(s) 120 are configured to be translated by the actuator(s) 122 between an expanded position and a contracted position. The tunnel-engagement structure(s) 120 are configured to engage (e.g., contact) an inner wall 148 of the tunnel 104 when in the expanded position and are configured to be disengaged (e.g., spaced) from the inner wall 148 when in the contracted position. In some examples, the actuator(s) 122 are configured to translate the tunnel-engagement structure(s) 120 linearly rearward when the tunnel-engagement structure(s) 120 are in the expanded position engaging the inner wall 148. In some examples, the actuator(s) 122 are configured to translate the tunnel-engagement structure(s) 120 linearly forward when the tunnel-engagement structure(s) 120 are in the contracted position disengaged from the inner wall 148.

For example, the actuator(s) 122 may be configured to translate the tunnel-engagement structure(s) 120 in a stepping motion, as described below. First, the actuator(s) 122 may translate the tunnel-engagement structure(s) 120 radially away from the housing 108 into the expanded position, such that the tunnel-engagement structure(s) 120 are engaged with the inner wall 148 of the tunnel 104. The actuator(s) 122 may then translate the tunnel-engagement structure(s) 120 rearward relative to the housing 108 with the tunnel-engagement structure(s) 120 engaging the inner wall 148 to propel hydro-excavation devices 100 forward. The tunnel-engagement structure(s) 120 may then be translated into the contracted position, in which the tunnel-engagement structure(s) 120 are disengaged from the inner wall 148. The actuator(s) 122 may then translate the tunnel-engagement structure(s) 120 linearly forward relative to the housing 108 to reset the locomotion system 118. This process may be repeated to propel hydro-excavation devices 100 through the tunnel 104.

The tunnel-engagement structure(s) 120 may comprise any suitable structure(s) that are configured to be translated by the actuator(s) 122 and that are configured to contact the inner wall 148 of the tunnel 104 to propel hydro-excavation devices 100 forward. In some examples, the tunnel-engagement structure(s) 120 comprise a plate and/or any other suitable rigid body operatively coupled to the actuator(s) 122 that is configured to be translated into a position that contacts the inner wall 148 of the tunnel 104.

The actuator(s) 122 may comprise any suitable mechanisms(s) that are configured to be actuated by the pressurized water and that are configured to operatively translate the tunnel-engagement structure(s) 120 when actuated. For example, the actuator(s) 122 may comprise at least one radial actuator 124 that is configured to translate the tunnel-engagement structure(s) 120 radially away from and/or toward the housing 108 and/or at least one axial actuator 126 that is configured to translate the tunnel-engagement structure(s) 120 axially linearly forward and rearward relative to the housing 108. As described herein, axial or axially may refer to a fore-aft direction, parallel to a longitudinal axis 144 of hydro-excavation devices 100. As described herein, radial or radially may refer to a direction that is transverse (e.g., perpendicular) to the longitudinal axis 144 of hydro-excavation devices 100. In some examples, the locomotion system 118 comprises a single actuator that is configured to translate the tunnel-engagement structure(s) 120 both radially outward and inward and axially forward and rearward.

In some examples, the radial actuator(s) 124 may comprise any suitable hydraulic actuator 128 (e.g., a hydraulic cylinder) having a translatable piston 125. For example, the radial actuator(s) 124 may comprise the piston 125 that is configured to be driven (e.g., extended and/or retracted) by the pressurized water. In some examples, the radial actuator(s) 124 comprise single-acting hydraulic actuator(s), in which the piston 125 is configured to be driven in a single direction by the pressurized water. For example, the piston 125 may be configured to be extended by the pressurized water and retracted by an external force that is not applied by the pressurized water. In some examples, the radial actuator(s) 124 comprise double-acting hydraulic actuators, in which the piston 125 is configured to be driven in two directions by the pressurized water. For example, the piston 125 may be configured to be extended and retracted by the pressurized water.

In some examples, the rigid body of the tunnel-engagement structure(s) 120 may be encased in an elastic material (e.g., an elastic sleeve 172). In such examples, the elastic sleeve 172 may be configured to permit the radial actuator(s) 124 to translate the tunnel-engagement structure(s) 120 radially away from the housing 108 into the expanded position and may be configured to return the tunnel-engagement structure(s) 120 to the contracted position after the actuator(s) 122 return to a neutral position. In some examples, the elastic sleeve 172 only encases the housing segments 110 of hydro-excavation devices 100 that support the locomotion system 118. In some examples, the elastic sleeve 172 may encase each housing segment 110 of hydro-excavation devices 100. In some examples, multiple elastic sleeves 172 may encase different portions of hydro-excavation devices 100. The elastic sleeve 172 may comprise rubber and/or any other suitable elastic material.

The radial actuator(s) 124 may be operatively coupled to the tunnel-engagement structure(s) 120 in any suitable manner that is configured to facilitate the radial actuator(s) 124 translating the tunnel engagement structure(s) 120 radially away from and toward the housing 108. For example, the radial actuator(s) 124 may be operatively coupled to the tunnel-engagement structure(s) 120, such that when the radial actuator(s) 124 are extended, the tunnel-engagement structure(s) 120 are translated into the expanded position, and when the radial actuator(s) 124 are retracted, the tunnel-engagement structure(s) 120 are translated into the contracted position or vice versa. In some examples, the locomotion system 118 comprises a linkage 162 including one or more links 164 operatively coupling one or more of the radial actuator(s) 124 to a respective one of the tunnel-engagement structure(s) 120. For example, the linkage 162 may be coupled to the piston(s) 125 of one or more of the radial actuator(s) 124 and to a respective one of the tunnel-engagement structure(s) 120. In such examples, the linkage 162 is configured to convert linear motion (e.g., retraction and extension) of the piston(s) 125 into radial inward and outward motion of the tunnel-engagement structure(s) 120 between the expanded and contracted positions. In some examples, the linkage 162 is similar to a scissor lift or scissor mechanism, as described further below with reference to the example of FIG. 5.

In some examples, the axial actuator 126 is configured to translate the tunnel-engagement structure(s) 120 linearly forward and rearward relative to the housing 108 by translating the entire locomotion-system housing 111 forward and rearward relative to the housing 108. For example, rather than having a fixed cylinder and a moving piston, the axial actuator 126 may comprise a fixed piston rod 155 and a sliding central hydraulic cylinder 154 that is configured to slide relative to the fixed piston rod 155. In such examples, the locomotion-system housing 111 may define the central hydraulic cylinder 154. In other words, the central hydraulic cylinder 154 may comprise a cylindrical chamber or barrel defined by and extending longitudinally through the locomotion-system housing 111. In such examples, the fixed piston rod 155 extends through the central hydraulic cylinder 154 defined by the locomotion-system housing 111. Each end of the fixed piston rod 155 is fixed to the housing 108 (e.g., fixed to a housing segment 110) of hydro-excavation devices 100, such that the fixed piston rod 155 is configured to remain in a fixed position relative to the housing 108. The fixed piston rod 155 is operatively received within the central hydraulic cylinder 154, such that the locomotion-system housing 111 is configured to slide axially forward and rearward on the fixed piston rod 155 relative to the housing 108. Explained in other words, the locomotion-system housing 111 is operatively mounted on the fixed piston rod 155, such that the locomotion-system housing 111 is configured to slide axially forward and rearward on the fixed piston rod 155 relative to the housing 108.

The fixed piston rod 155 includes a cylindrical central piston 157 that is disposed within the central hydraulic cylinder 154. When pressurized water is received within the central hydraulic cylinder 154 forward of the cylindrical central piston 157, the locomotion-system housing 111 is forced to slide forward on the fixed piston rod 155 relative to the housing 108. When pressurized water is received within the central hydraulic cylinder 154 rearward of the cylindrical central piston 157, the locomotion system housing 111 is forced to slide rearward on the fixed piston rod 155 relative to the housing 108. The tunnel-engagement structure(s) 120 are operatively coupled to the locomotion system housing 111, such that the tunnel engagement structure(s) 120 slide forward and rearward with the locomotion-system housing 111 relative to the housing 108.

In some examples, the locomotion system 118 comprises one or more valves and/or other water control mechanisms that are configured to selectively control the water received from the pressurized water supply 102 in order to selectively actuate the actuator(s) 122. For example, the locomotion system 118 may comprise at least one solenoid valve 130 and/or one or more pilot-operated valves 156 that is/are configured to selectively control the water received from the pressurized water supply 102 to drive the actuator(s) 122. In some examples, the pilot-operated valves 156 are not present and the solenoid valve(s) 130 are configured to directly control the flow of pressurized water to and from the actuator(s) 122. In some examples, the pilot-operated valve(s) 156 comprise one or more normally-open pilot-operated valves 158 and/or one or more normally-closed pilot-operated valves 160 operatively coupling the pressurized water supply 102 to the actuator(s) 122. In such examples, the at least one solenoid valve 130 may be configured to adjust the state (e.g., open or closed) of the pilot-operated valves 156 to selectively control the flow of water through the pilot-operated valves 156 to the actuator(s) 122.

The solenoid valve(s) 130 and/or the pilot-operated valve(s) 156 may be onboard (e.g., directly coupled to and/or supported by) the hydro-excavation devices 100 or may be disposed above ground and operatively coupled to the hydro-excavation devices 100 by one or more of the external water supply line(s) 146. The solenoid valve(s) 130, the pilot-operated valves 156, and/or the actuator(s) 122 may be arranged in any suitable manner configured to facilitate driving the tunnel engagement structure(s) 120 utilizing the water received from the pressurized water supply 102, as described further below with reference to the examples of locomotion system 118 schematically illustrated in FIGS. 3 and 5.

In some examples, hydro-excavation devices 100 comprise multiple locomotion systems 118 supported by different housing segments 110 of the housing 108. For example, in the example hydro-excavation device 100 of FIG. 2, the hydro-excavation device 100 comprises a first locomotion system 118A supported by the middle housing segment 115C and a second locomotion system 118B supported by the middle housing segment 115D. Each locomotion system 118A and 118B comprises two respective tunnel-engagement structures 120. Hydro-excavation devices 100 may comprise any suitable number and arrangement of the locomotion systems 118 necessary to propel the hydro-excavation device 100 through the tunnel 104.

In some examples, hydro-excavation devices 100 comprise an articulable joint 132 that connects the forward-most housing segment 112 to a second segment 134 of the plurality of housing segments 110. In such examples, the articulable joint 132 is configured to permit pivotal and/or rotational motion of the forward-most housing segment 112 relative to the second segment 134. For example, the articulable joint 132 may comprise a universal joint that is configured to permit the motion of the forward-most housing segment 112 relative to the second segment 134. In some examples, hydro-excavation devices 100 comprise a joint actuator 136 that is operatively coupled to the articulable joint 132. The joint actuator 136 is configured to control the motion of the forward-most housing segment 112 relative to the second segment 134 by actuating the articulable joint 132. Pivoting the forward-most housing segment 112 redirects the nozzle 116 supported by the forward-most housing segment 112 and therefore the direction in which hydro-excavation devices 100 excavate the tunnel 104. This facilitates hydro-excavation devices 100 maneuvering around obstacles, such as large rocks, existing utilities, piping, etc.

In some examples, a respective articulable joint 140 connects each of the plurality of housing segments 110 to an adjacent housing segment 110, such that each housing segment 110 is articulated relative to each other. In such examples, each respective articulable joint 140 may be operatively coupled to a respective joint actuator 136.

In some examples, hydro-excavation devices 100 comprise at least one sensor 150 that is configured to detect an external environment of hydro-excavation devices 100. For example, hydro-excavation devices 100 may comprise any suitable sensors 150 that are configured to detect or visualize obstructions in front of the device 100, such as one or more acoustic sensors, cameras, ground penetrating radar sensors, etc. Information captured by the sensor(s) 150 may then be utilized to determine specific actions taken by hydro-excavation devices 100. For example, if an obstruction is detected in front of hydro-excavation devices 100, hydro-excavation devices 100 may be maneuvered around the obstruction by articulating one or more of the housing segments 110 and/or the locomotion system 118 or nozzle 116. The sensor(s) 150 may be housed within one or more of the housing segments 110 and/or coupled to one or more of the housing segments 110.

Hydro-excavation devices 100 may be remotely controlled, e.g., by a worker on the surface, and/or hydro-excavation devices 100 may comprise an electronic controller 131 that is configured to automatically control aspects of hydro-excavation devices 100. For example, if the sensor(s) 150 detect an obstruction within the path of hydro-excavation devices 100, e.g., existing utilities, piping, etc., the electronic controller 131 may include processing logic configured to automatically stop the ejection of water from the nozzle 116, turn off the locomotion system 118, and/or articulate the forward-most housing segment 112 to change the direction of excavation and navigate hydro-excavation devices 100 around the obstacle. In some examples, the electronic controller 131 is operatively coupled to the solenoid valve(s) 130 of the locomotion system 118 in order to selectively switch the solenoid valve(s) 130 open and closed to operate the locomotion system 118, as described further below.

The articulation of the housing segments 110 relative to each other, the locomotion system 118, and/or the ejection of the water from the nozzle 116 may be automatically controlled by the electronic controller 131, remotely controlled by a worker at the surface, and/or a combination of both. In some examples, hydro-excavation devices 100 comprise a radio receiver 138 that is configured to receive remote control signals from a worker above the surface to control the different actions of hydro-excavation devices 100. The electronic controller 131 and/or the radio receiver 138 may be housed within any suitable housing segment 110.

With continued reference to FIGS. 2-8, illustrative non-exclusive examples of hydro-excavation devices 100 and/or non-exclusive examples of locomotion systems 118 for hydro-excavation devices 100 are illustrated. Where appropriate, the reference numerals from the schematic illustrations of FIG. 1 are used to designate corresponding parts of the examples of FIGS. 2-8; however, the examples of FIGS. 2-8 are non-exclusive and do not limit the hydro-excavation devices 100 and locomotion systems 118 to the illustrated embodiments of FIGS. 2-8. That is, hydro-excavation devices 100 and locomotion systems 118 are not limited to the specific embodiments of FIGS. 2-8, and hydro-excavation devices 100 and locomotion systems 118 may incorporate any number of the various aspects, configurations, characteristics, properties, etc. of the hydro-excavation devices 100 and the locomotion systems 118 that are illustrated in and discussed with reference to the schematic representations of FIG. 1 and/or the embodiments of FIGS. 2-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 2-8; however, it is within the scope of the present disclosure that the previously discussed features, variants, etc. may be utilized with the examples of FIGS. 2-8.

FIG. 2 illustrates a perspective view of an example hydro-excavation device 100. As shown in FIG. 2, hydro-excavation device 100 comprises a housing 108 including a forward-most housing segment 112, a rearward-most housing segment 114, and four middle housing segments 115A-D disposed between the forward-most housing segment 112 and the rearward-most housing segment 114. The housing segments are operatively coupled to each other, such that the coupled housing segments are permitted to pivot, rotate, or otherwise articulate relative to each other. The hydro-excavation device 100 comprises a pair of locomotion systems 118A and 118B supported by respective middle housing segments 115B and 115D of the hydro-excavation device. Each locomotion system 118A, 118B comprises a pair of tunnel-engagement structures 120 configured to facilitate propelling the hydro-excavation device 100 forward during use. The forward-most housing segment 112 supports a nozzle 116 that is configured to eject pressurized water forward of the hydro-excavation device 100 in order to excavate a tunnel.

Figure 3:
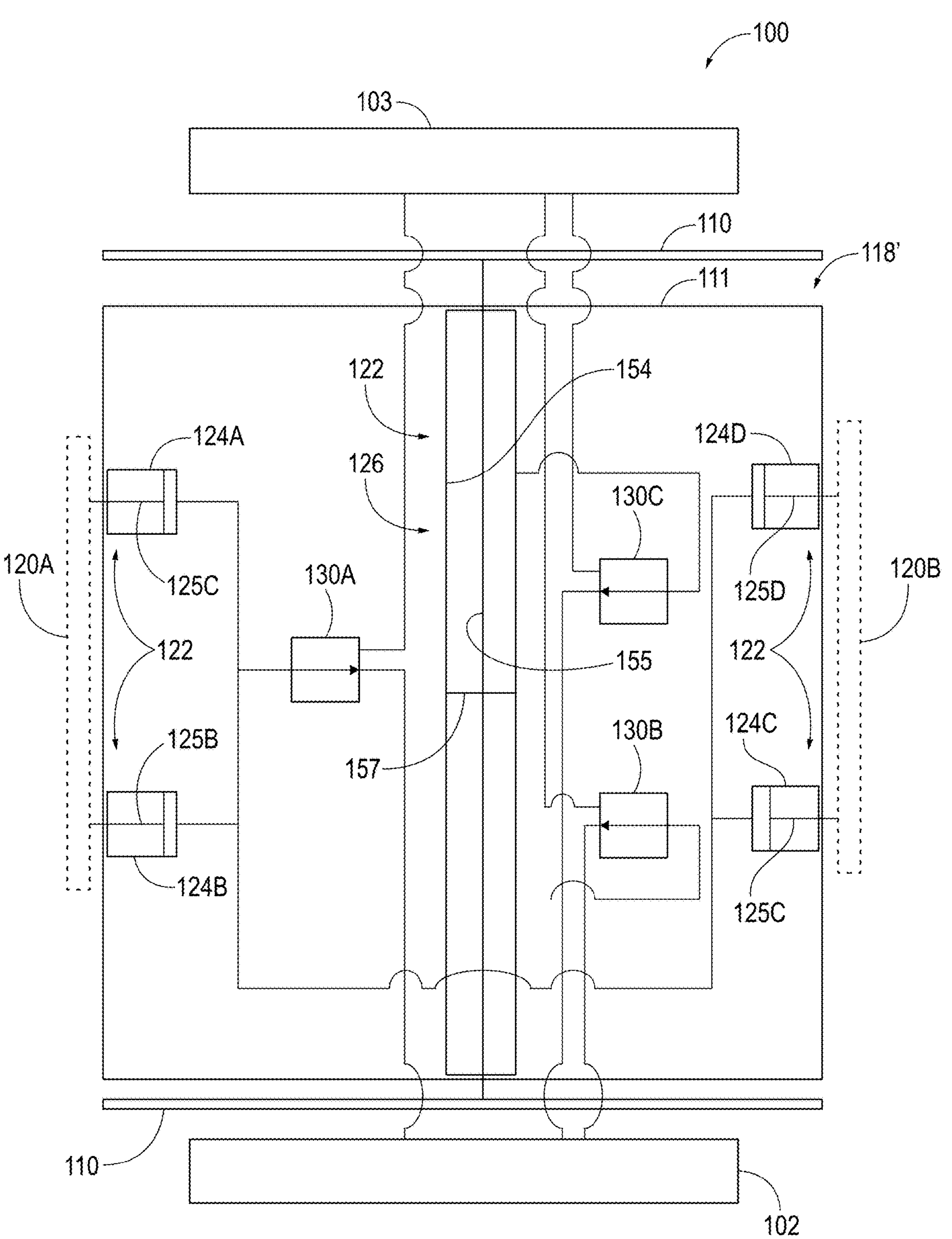
FIG. 3 is a schematic diagram representing an example locomotion system of hydro-excavation devices.
Figure 4:
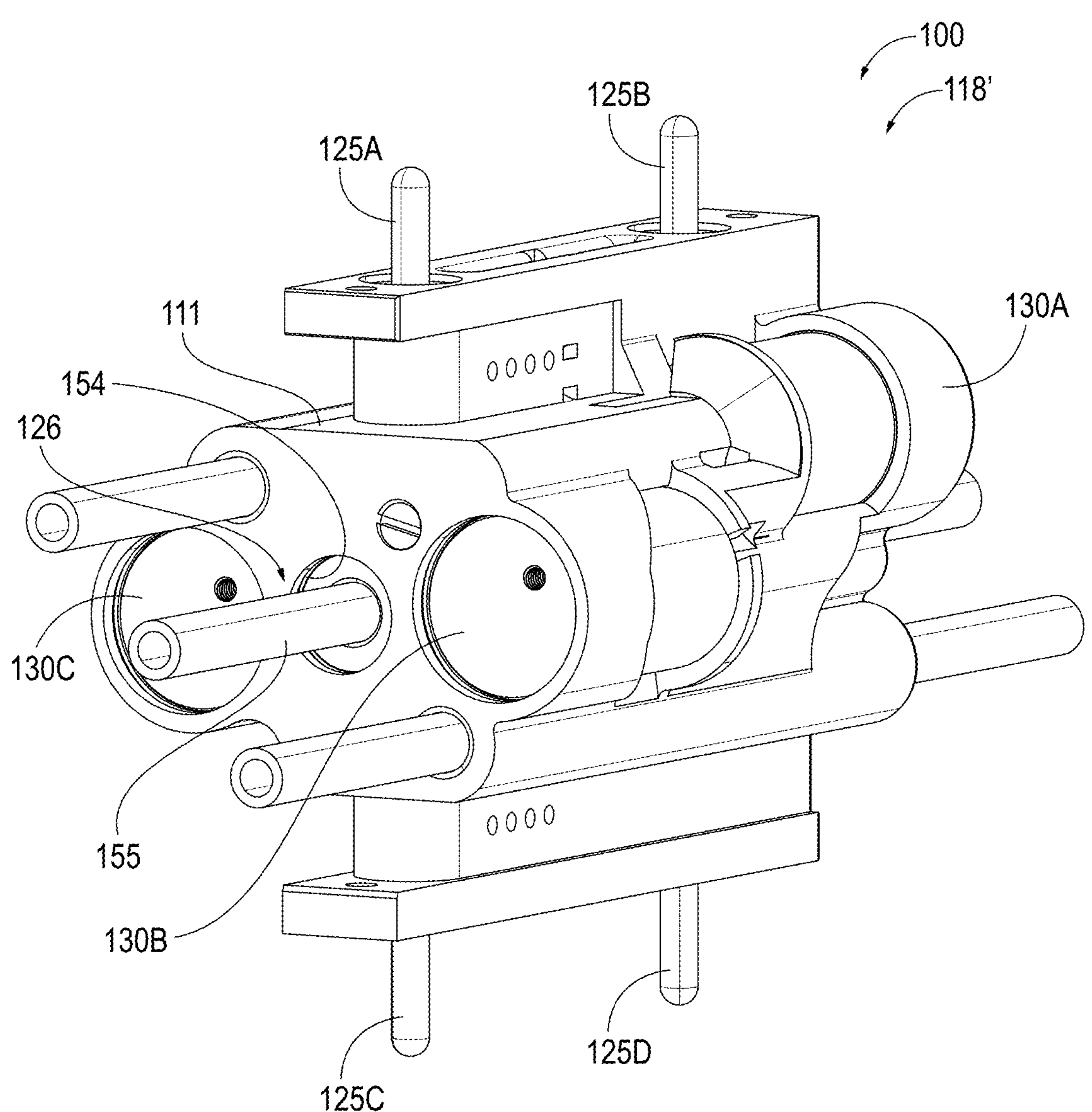
FIG. 4 is a perspective view representing an example of the locomotion system of FIG. 3.

FIGS. 3-4 illustrate an example locomotion system 118'. The locomotion system 118' is a non-limiting example of the locomotion systems 118, described above. The locomotion system 118' is configured to be operatively coupled to and supported by a device, such as hydro-excavation devices 100 described herein, and is configured to propel the device forward, during use. In the description of FIGS. 3-4 below, the locomotion system 118' is shown and described as being operatively coupled to and supported by a respective housing segment 110 of an example hydro-excavation device 100. However, the locomotion system 118' may be utilized with any other suitable devices that require an onboard locomotion system.

The locomotion system 118' is configured to selectively control pressurized water received from a pressurized water supply 102 to drive the motion of a pair of tunnel-engagement structures 120A and 120B. Specifically, in the example of FIG. 3, the locomotion system 118' is configured to drive a pair of tunnel-engagement structures 120A and 120B both radially outward and inward between an expanded position and a contracted position and axially forward and rearward relative to the housing segment 110. The locomotion system 118' comprises a locomotion-system housing 111 configured support the other components of the locomotion system 118'. The locomotion-system housing 111 may be coupled to and supported by any suitable housing segment of the plurality of housing segments 110 of the hydro-excavation devices 100, as described above.

The locomotion system 118' comprises a plurality of actuators 122 and a plurality of solenoid valves 130A, 130B, 130C operatively coupling the plurality of actuators 122 to the pressurized water supply 102. Each of the solenoid valves 130A, 130B, 130C is configured to regulate the flow of pressurized water from the pressurized water supply 102 to one or more of the actuators 122 in order to selectively actuate the actuators 122. The actuators 122 comprise a plurality of radial actuators 124A, 124B, 124C, 124D and an axial actuator 126 extending longitudinally through the locomotion-system housing 111. The plurality of radial actuators 124A, 124B, 124C, 124D are configured to translate the pair of tunnel-engagement structures 120A-B radially away from and toward the locomotion-system housing 111 and the housing segment 110 between an expanded position and a contracted position. The axial actuator 126 is configured to translate the entire locomotion-system housing 111 axially forward and rearward relative to the housing segment 110 of the hydro-excavation device 100 that is supporting the locomotion-system housing 111.

The locomotion system 118' comprises a first solenoid valve 130A operatively coupling the plurality of radial actuators 124A-D to the pressurized water supply 102. In some examples, the pressurized water supply 102 comprises an internal water supply line, e.g., internal water supply line 152 of hydro-excavation devices 100, described above. The first solenoid valve 130A is further operatively coupled to a vent line 103 that permits the release of used water from the system.

The first solenoid valve 130A is configured to selectively control the pressurized water to drive, or otherwise operate, the plurality of radial actuators 124A-D. The first solenoid valve 130A is electronically powered, for example, by any suitable electronic controller, e.g., electronic controller 131 of hydro-excavation devices 100, described above. For example, the electronic controller may selectively switch the first solenoid valve 130A between an open position and a closed position. When the first solenoid valve 130A is switched open, the first solenoid valve 130A permits water to pass from the pressurized water supply 102 to the plurality of radial actuators 124A-D. When the first solenoid valve 130A is switched closed, the first solenoid valve 130A prevents the pressurized water from passing to the plurality of radial actuators 124A-D. When the first solenoid valve 130A is switched closed, the water that was previously used to drive the radial actuators 124A-D is permitted to be vented through the first solenoid valve 130A to the vent line 103.

Each radial actuator 124A-D may comprise, for example, a hydraulic cylinder comprising a translatable piston 125A-D operatively coupled to a respective one of tunnel-engagement structures 120A-B. When the first solenoid valve 130A is in the open position, water from the pressurized water supply 102 applies a pressure on the piston 125A-D of each radial actuator 124A-D, which extends the pistons 125A-D radially outward. As the pistons 125A-D are extended radially outward, the pistons 125A-D apply a pressure on the tunnel-engagement structures 120A-B in order to translate the tunnel-engagement structures 120A-B radially outward. In some examples, the radial actuators 124A-D are configured to translate the tunnel-engagement structures 120A-B radially outward to the expanded position, in which the tunnel-engagement structures 120A-B are positioned to contact and engage an inner wall (e.g., inner wall 148) of a tunnel (e.g., tunnel 104) being excavated by the water excavation device 100. When the first solenoid valve 130A is switched to the closed position, the water applying the pressure on the pistons 125A-D is vented from the system through the first solenoid valve 130A. As a result, the pistons 125A-D cease to apply the outward pressure on the tunnel-engagement structures 120A-B and the pistons 125A-D are permitted to be retracted.

In some examples, the tunnel-engagement structures 120A-B are encased in or otherwise engaged by an elastic material (e.g., an elastic sleeve 172). The elastic material may be configured to permit the radial actuators 124A-D to translate the tunnel-engagement structures 120A-B radially outward and may be configured to automatically return the tunnel-engagement structures 120A-B to a position proximate the locomotion-system housing 111 (e.g., the contracted position) after the pressurized water is vented from the radial actuators 124A-D. However, any suitable mechanism for biasing the tunnel-engagement structures 120A-B toward the housing may be utilized, including various types and configurations of springs. In this manner, the first solenoid valve 130A and the radial actuators 124A-D facilitate the translation of the tunnel-engagement structures 120A-B radially outward and inward relative to the locomotion-system housing 111 and the housing segment 110 of the hydro-excavation device 100.

The locomotion system 118' further comprises the axial actuator 126 that is configured to translate the tunnel-engagement structures 120A-B axially and linearly forward and rearward relative to the housing segment 110 of the hydro-excavation device 100 supporting the locomotion system 118'. Specifically, the axial actuator 126 is configured to translate the entire locomotion-system housing 111 forward and rearward relative to the housing segment 110. The tunnel-engagement structures 120A-B are operatively coupled to the locomotion-system housing 111, such that the tunnel-engagement structures 120A-B are translated forward and rearward with the locomotion-system housing 111 relative to the housing segment 110.

As shown in FIG. 3, the locomotion system 118' comprises a central hydraulic cylinder 154 defined by and extending longitudinally through the locomotion-system housing 111. In other words, the central hydraulic cylinder 154 comprises a cylindrical recess or chamber defined by the locomotion-system housing 111. The axial actuator 126 comprises a fixed piston rod 155 that is operatively received in the central hydraulic cylinder 154. The fixed piston rod 155 extends through the central hydraulic cylinder 154 and externally to the central hydraulic cylinder 154 forward and rearward of the locomotion-system housing 111. Each end of the fixed piston rod 155 is fixed to the housing segment 110 of the hydro-excavation device 100 forward and rearward of the locomotion-system housing 111. The locomotion-system housing 111 is configured to slide on the fixed piston rod 155 axially forward and rearward relative to the fixed piston rod 155 and the housing segment 110 responsive to pressure applied by pressurized water received within the central hydraulic cylinder 154.

As shown in FIG. 3, the fixed piston rod 155 comprises a central piston 157 received in the central hydraulic cylinder 154. When pressurized water is received in the central hydraulic cylinder 154 forward of the central piston 157, the pressurized water applies a forward force on the locomotion-system housing 111, which forces the locomotion-system housing 111 to slide forward on the fixed piston rod 155 relative to the housing segment 110. When pressurized water is received in the central hydraulic cylinder 154 rearward of the central piston 157, the locomotion-system housing 111 is forced to slide rearward on the fixed piston rod 155 relative to the housing segment 110.

The central hydraulic cylinder 154 is operatively coupled to the pressurized water supply 102 by the second solenoid valve 130B and the third solenoid valve 130C. The second solenoid valve 130B and the third solenoid valve 130C are substantially similar to the first solenoid valve 130A, described above. The second and third solenoid valves 130B-C are electronically controlled (e.g., via electronic controller 131) and are configured to be switched between open and closed positions. The second and third solenoid valves 130B-C are each operatively coupled to the vent line 103 to facilitate the removal of used water from the system. When switched open, the second solenoid valve 130B and the third solenoid valve 130C are each configured to permit water from the pressurized water supply 102 to flow into the central hydraulic cylinder 154. Specifically, the second solenoid valve 130B is operatively coupled to the central hydraulic cylinder 154 rearward of the central piston 157 and the third solenoid valve 130C is operatively coupled to the central hydraulic cylinder 154 forward of the central piston 157. As such, when the second solenoid valve 130B is open and the third solenoid valve 130C is closed, the pressurized water is permitted to flow into the central hydraulic cylinder 154 rearward of the central piston 157, which forces the locomotion-system housing 111 to slide rearward on the fixed piston rod 155 relative to the housing segment 110. When the third solenoid valve 130C is open and the second solenoid valve 130B is closed, the pressurized water is permitted to flow into the central hydraulic cylinder 154 forward of the central piston 157, which forces the locomotion-system housing 111 to slide forward on the fixed piston rod 155 relative to the housing segment 110.

In some examples, the second solenoid valve 130B and the third solenoid valve 130C may be switched open and closed in an alternating pattern, such that when the second solenoid valve 130B is open, the third solenoid valve 130C is closed and vice versa. This facilitates selectively driving the locomotion-system housing 111 and the tunnel-engagement structures 120A-B that are coupled to the locomotion-system housing 111 axially and linearly forward and rearward relative to the housing segment 110.

In some examples, the electronic controller (e.g., electronic controller 131 shown in FIG. 1) is configured to control the switching of the first, second, and third solenoid valves 130A-C in the above-described manner, such that the tunnel-engagement structures 120A and 120B are first translated radially away from the housing segment 110 into the expanded position contacting the inner wall of the tunnel, and then translated linearly rearward relative to the housing segment 110 of the hydro-excavation device 100, while the tunnel-engagement structures 120A-B are contacting the inner wall. This motion of the tunnel-engagement structures 120A-B is configured to move the hydro-excavation device 100 forward through the tunnel. After the tunnel-engagement structures 120A-B are translated radially outward and rearward to move the hydro-excavation device 100 forward, the electronic controller may control the switching of the solenoid valves 130A-C to return the tunnel-engagement structures to the starting position. For example, the electronic controller may switch the first solenoid valve 130A to the closed position, such that the water is vented from the radial actuators 124A-D and the tunnel-engagement structures 120A-B are translated radially toward the housing segment 110 into the contracted position, e.g., in response to a force applied by the elastic sleeve 172 encasing the tunnel-engagement structures 120A-B. At this time, the electronic controller may switch the second solenoid valve 130B to the closed position, and the third solenoid valve 130C to the open position, such that the tunnel-engagement structures 120A-B are translated linearly forward to a forward-most starting position. Once the tunnel-engagement structures 120A-B are returned to the starting position, the above-described process may be repeated to continue to move the device supporting the locomotion system 118' forward through the tunnel.

FIG. 4 represents a non-limiting example of the locomotion system 118', described above. As shown in FIG. 4, example locomotion system 118' comprises a locomotion-system housing 111 that houses and/or supports an axial actuator 126 comprising a central hydraulic cylinder 154 and a fixed piston rod 155, a first, second, and third solenoid valve 130A-C, and a plurality of radial actuator(s) 124A-D comprising pistons 125A-D, respectively.

Although not shown in FIG. 4, the ends of fixed piston rod 155 may be fixed to a housing segment 110 of the hydro-excavation device 100, as schematically shown in FIG. 3. The locomotion-system housing 111 is configured to slide on the fixed piston rod 155 axially forward and rearward relative to the housing segment 110 that the fixed piston rod 155 is fixed to. The pistons 125A-D may be operatively coupled to one or more tunnel-engagement structures (e.g., tunnel-engagement structures 120A-B) in any suitable manner, such that the extension of the pistons 125A-D forces the tunnel-engagement structures radially away from the locomotion-system housing 111 into the expanded position.

FIGS. 5-8 illustrate another example locomotion system 118". The locomotion system 118" is a non-limiting example of the locomotion systems 118, described above with reference to FIG. 1. The locomotion system 118" is configured to be operatively coupled to and supported by a device, such as hydro-excavation devices 100 described herein, and is configured to propel the device forward, during use. In the description of FIGS. 5-8 below, the locomotion system 118" is shown and described as being operatively coupled to and supported by a respective housing segment 110 of an example hydro-excavation device 100. However, the locomotion system 118" may be utilized with any other suitable devices that require an onboard locomotion system.

Figure 5:
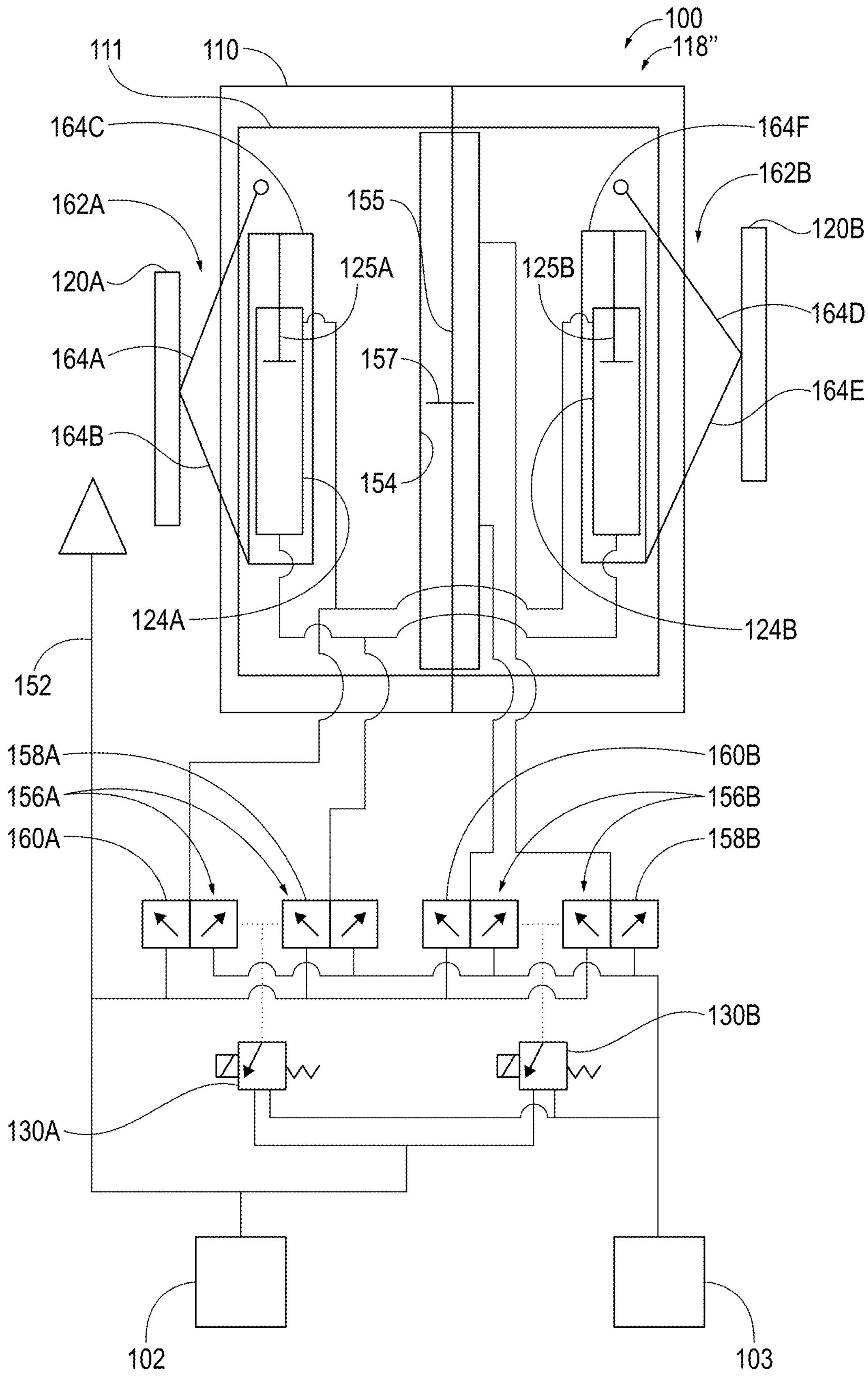
FIG. 5 is a schematic diagram representing another example locomotion system of hydro-excavation devices.

FIG. 5 is a schematic diagram representing the example locomotion system 118". As shown in FIG. 5, the locomotion system 118" comprises a locomotion-system housing 111 operatively coupled to and supporting first and second tunnel-engagement structures 120A and 120B, first and second radial actuators 124A and 124B, and a central hydraulic cylinder 154 extending longitudinally through the locomotion-system housing 111. The locomotion system 118" is operatively coupled to a pressurized water supply 102 and is configured to regulate the flow of pressurized water from the pressurized water supply 102 to the radial actuators 124A, 124B and the central hydraulic cylinder 154 to actuate the radial actuators 124A, 124B and the central hydraulic cylinder 154. When actuated, the radial actuators 124A, 124B and the central hydraulic cylinder 154 are configured to facilitate translating the tunnel-engagement structures 120A and 120B in a stepping motion that propels the hydro-excavation device 100 supporting the locomotion system 118" forward.

The radial actuators 124A, 124B are configured to translate the tunnel-engagement structures 120A, 120B radially away from and toward the locomotion-system housing 111 when actuated. The first radial actuator 124A comprises a first piston 125A and the second radial actuator 124B comprises a second piston 125B. The first and second pistons 125A, 125B are configured to be linearly translated, e.g., extended and retracted, responsive to pressure applied by the pressurized water received within the first and second radial actuators 124A, 124B. For example, the pressurized water may apply a force on either side of the pistons 125A, 125B in order to extend the pistons 125A, 125B or retract the pistons 125A, 125B.

The radial actuators 124A, 124B of locomotion system 118" are oriented longitudinally across the locomotion-system housing 111. In other words, the radial actuators 124A, 124B are oriented in a fore-aft direction, parallel to a longitudinal, or long axis of the locomotion-system housing 111 and the hydro-excavation device 100 supporting the locomotion system 118". As such, the pistons 125A, 125B of the radial actuators 124A, 124B are configured to be linearly translated in forward and rearward directions when extended and retracted. As described below, the first and second radial actuators 124A, 124B are operatively coupled to the first and second tunnel-engagement structure 120A, 120B by respective first and second linkages 162A, 162B that are configured to convert the linear forward and rearward translation of the first and second pistons 125A, 125B into radial outward and inward translation of the first and second tunnel-engagement structures 120A, 120B.

Specifically, the first radial actuator 124A is operatively coupled to the first tunnel-engagement structure 120A by the first linkage 162A and the second radial actuator 124B is operatively coupled to the second tunnel-engagement structure 120B by the second linkage 162B. The first and second linkages 162A, 162B are each configured to convert linear forward and rearward translation (e.g., extension and retraction) of the pistons 125A, 125B of the radial actuators 124A, 124B into radial inward and outward translation of the tunnel-engagement structures 120A, 120B relative to the locomotion-system housing 111. Specifically, the linkages 162A, 162B operatively couple the radial actuators 124A, 124B to the tunnel-engagement structures 120A, 120B, such that when the radial actuators 124A, 124B are extended (e.g., translated linearly in the forward direction), the tunnel-engagement structures 120A, 120B are translated radially outward into an expanded position, and when the radial actuators 124A, 124B are retracted (e.g., translated linearly in the rearward direction), the tunnel-engagement structures 120A, 120B are translated radially inward into a contracted position. As described above with reference to FIG. 1, the tunnel-engagement structures 120A, 120B may be positioned to engage and contact an inner wall (e.g., inner wall 148, as described above) of a tunnel when in the expanded position and may be positioned to be disengaged from the inner wall when in the contracted position.

In some examples, the first and second linkages 162A and 162B are configured to function similarly to a scissor lift that is driven by the first and second radial actuators 124A and 124B. For example, as shown in FIG. 5, the first linkage 162A comprises a first link 164A, a second link 164B, and a third link 164C. The third link 164C is operatively coupled to the first radial actuator 124A and is slidingly coupled to the locomotion-system housing 111, such that the third link 164C is configured to be linearly and axially translated forward and backward relative to the locomotion-system housing 111 by the first radial actuator 124A. A lower end of the first link 164A is fixed to the locomotion-system housing 111 and a lower end of the second link 164B is slidingly coupled to the locomotion-system housing 111 by the third link 164C. Upper ends of the first and second links 164A, 164B are operatively coupled to each other and to the first tunnel-engagement structure 120A. The upper ends of the first and second links 164A, 164B are configured to be translated radially away from and toward the locomotion-system housing 111 by adjusting a distance between the lower ends of the first and second links 164A, 164B, as described below.

When the first radial actuator 124A is extended, the third link 164C is linearly translated in the forward direction relative to the locomotion-system housing 111, and when the radial actuator 124A is retracted, the third link 164C is linearly translated in the rearward direction. When the third link 164C is translated forward by the first radial actuator 124A (e.g., when the first piston 125A is extended), the lower end of the second link 164B is pulled closer to the lower end of the first link 164A. This forces the coupled upper ends of the first and second links 164A and 164B radially outward and away from the locomotion-system housing 111 and the housing segment 110. This also forces the first tunnel-engagement structure 120A, which is coupled to the upper ends of the first and second links 164A, 164B, radially outward and away from the locomotion-system housing 111 and the housing segment 110. Similarly, when the third link 164C is translated rearward by the first radial actuator 124A (e.g., when the first piston 125B is retracted), the lower end of the second link 164B is forced further away from the lower end of the first link 164A, such that the coupled upper ends of the first and second links 164A and 164B are forced radially inward and toward the locomotion-system housing 111. This forces the first tunnel-engagement structure 120A radially inward and toward the locomotion-system housing 111 and the housing segment 110.

In the above-described manner, the first linkage 162A is configured to convert the fore-aft translation (e.g., extension and retraction) of the first radial actuator 124A into radial inward and outward motion of the first tunnel-engagement structure 120A relative to the locomotion-system housing 111. The second linkage 162B is substantially identical to the first linkage 162A and comprises links 164D, 164E, and 164F. The second linkage 162B is configured to convert the linear forward and rearward translation of the second radial actuator 124B into radial inward and outward motion of the second tunnel-engagement structure 120B relative to the locomotion-system housing 111 in the same manner as the first linkage 162A.

The locomotion-system housing 111 defines a central hydraulic cylinder 154 that is configured to facilitate the axial and linear forward and rearward translation of the locomotion-system housing 111 relative to the housing segment 110 of the hydro-excavation device 100. The first and second tunnel-engagement structures 120A, 120B are coupled to the locomotion-system housing 111 (e.g., by first and second linkages 162A, 162B), such that when the locomotion-system housing 111 is translated forward and rearward relative to the housing segment 110, the first and second tunnel-engagement structures 120A, 120B are also translated forward and rearward relative to the housing segment 110. The central hydraulic cylinder 154 is example of the axial actuator(s) 126, described herein.

The central hydraulic cylinder 154 comprises a generally cylindrical recess or cylindrical chamber defined by and extending longitudinally through the locomotion-system housing 111. A fixed piston rod 155 extends through the central hydraulic cylinder 154 and extends outward on forward and rearward sides of the locomotion-system housing 111. The fixed piston rod 155 is fixed at each end to the housing segment 110 of the hydro-excavation device 100, such that the fixed piston rod 155 extends parallel to or along a longitudinal axis of the housing segment 110 in a fixed position relative to the housing segment 110. The fixed piston rod 155 comprises a central cylindrical piston 157 disposed within the central hydraulic cylinder 154.

The locomotion-system housing 111 is configured to slide axially forward and rearward on the fixed piston rod 155 relative to the housing segment 110. For example, when pressurized water is received within the central hydraulic cylinder 154 forward of the central piston 157, the locomotion-system housing 111 is forced to slide axially and linearly forward on the fixed piston rod 155. When pressurized water is received within the central hydraulic cylinder 154 rearward of the central piston 157, the locomotion-system housing 111 is forced to slide axially and linearly rearward on the fixed piston rod 155. In this manner, the central hydraulic cylinder 154, fixed piston rod 155, and central piston 157 facilitate linear forward and rearward translation of the locomotion-system housing 111 and the first and second tunnel-engagement structures 120A-B relative to the housing segment 110.

Locomotion system 118" comprises one or more valves and/or other water regulating mechanisms configured to operatively couple the radial actuators 124A, 124B and/or the central hydraulic cylinder 154 to the pressurized water supply 102. For example, as shown in FIG. 5, The locomotion system 118" comprises a first solenoid valve 130A operatively coupled to a first pair of pilot-operated valves 156A and a second solenoid valve 130B operatively coupled to a second pair of pilot-operated valves 156B. The first solenoid valve 130A and the first pair of pilot-operated valves 156A are configured to operatively couple the first and second radial actuators 124A, 124B to the pressurized water supply 102. The second solenoid valve 130B and the second pair of pilot-operated valves 156B are configured to operatively couple the central hydraulic cylinder 154 to the pressurized water supply 102.

The first pair of pilot-operated valves 156A comprises a first normally-open (NO) pilot-operated valve 158A and a first normally-closed (NC) pilot-operated valve 160A. The first normally-open pilot-operated valve 158A is biased open, e.g., by a spring or any other suitable biasing member. When no pressure is applied on the biasing member, the first normally-open pilot-operated valve 158A is held open, and the first normally-open pilot-operated valve 158A is configured to be forced closed response to a pressure applied on the biasing member. For example, pressurized water may apply a pressure on the spring and/or other suitable biasing member of the first normally-open pilot-operated valve 158A, which compresses the spring and closes the normally-open pilot-operated valve 158A. The first normally-closed pilot-operated valve 160A is biased closed, e.g., by a spring or any other suitable biasing member. When a pressure is applied on the biasing member of the first normally-closed pilot-operated valve 160A, the first normally-closed pilot-operated valve 160A is configured to be forced open.

When the first normally-open pilot-operated valve 158A or the first normally-closed pilot-operated valve 160A is open, pressurized water is permitted to flow through the valve from the pressurized water supply 102 to the first and second radial actuators 124A, 124B. When the first normally-open pilot-operated valve 158A or the first normally-closed pilot-operated valve 160A is closed, pressurized water is prevented from flowing through the valve from the pressurized water supply 102 to the first and second radial actuators 124A, 124B. In some examples, when the first normally-open pilot-operated valve 158A or the first normally-closed pilot-operated valve 160A is closed, used water is permitted to be vented from the first and second radial actuators 124A, 124B through the valve to a vent line 103.

The first normally-open pilot-operated valve 158A and the first normally-closed pilot-operated valve 160A are operatively connected to each other, such that the first normally-closed pilot operated valve 160A and the first normally-open pilot-operated valve 158A are configured to be in opposite states than each other. For example, when the first normally-closed pilot-operated valve 160A is closed, the first normally-open pilot-operated valve 158A is open, and when the first normally-closed pilot-operated valve 160A is open, the first normally-open pilot-operated valve 158A is closed.

The first normally-open pilot-operated valve 158A and the first normally-closed pilot-operated valve 160A each operatively couple the first and second radial actuators 124A, 124B to the pressurized water supply 102. The first normally-open pilot-operated valve 158A is configured to control extension of the first and second radial actuators 124A, 124B and the first normally-closed pilot-operated valve 160A is configured to control retraction of the first and second radial actuators 124A, 124B. Explained in other words, when the first normally-open pilot-operated valve 158A is open and the first normally-closed pilot operated valve 160A is closed, the pressurized water is permitted to flow through the first normally-open pilot-operated valve 158A to the first and second radial actuators 124A, 124B and is prevented from flowing through the first normally-closed pilot-operated valve 160A. The first normally-open pilot-operated valve 158A is operatively coupled to the first and second radial actuators 124A, 124B, such that when the first normally-open pilot-operated valve 158A is open, the pressurized water forces the pistons 125A, 125B to be extended (e.g., translated linearly forward). When the first normally-closed pilot-operated valve 160A is open and the first normally-open pilot operated valve 158A is closed, the pressurized water is permitted to flow through the normally-closed pilot-operated valve 160A and is prevented from flowing through the normally-open pilot-operated valve 158A. The normally-closed pilot-operated valve 160A is operatively coupled to the first and second radial actuators 124A, 124B, such that when the first normally-closed pilot-operated valve 160A is open, the pressurized water forces the pistons 125A, 125B to be retracted (e.g., translated linearly rearward).

The first solenoid valve 130A is operatively coupled to the first normally-open pilot-operated valve 158A and the first normally-closed pilot-operated valve 160A. The first solenoid valve 130A is configured to selectively switch the states (e.g., open or closed) of the first normally-open pilot-operated valve 158A and the first normally-closed pilot-operated valve 160A. By controlling the states of the first normally-open pilot-operated valve 158A and the first normally-closed pilot-operated valve 160A, the first solenoid valve 130A selectively controls the extension and retraction of the first and second radial actuators 124A, 124B, and therefore the radial inward and outward translation of the tunnel-engagement structures 120A, 120B.

For example, the first solenoid valve 130A may be configured to be selectively opened and closed by an electronic controller, e.g., electronic controller 131, described above. When the first solenoid valve 130A is open, pressurized water is permitted to flow from the pressurized water supply 102 to the first normally-open pilot-operated valve 158A and the first normally-closed pilot-operated valve 160A through the first solenoid valve 130A. The pressurized water from the first solenoid valve 130A applies a pressure on the biasing members (e.g., springs of the first normally-open pilot-operated valve 158A and the first normally-closed pilot-operated valve 160A, such that the first normally-open pilot-operated valve 158A is forced closed and the first normally-closed pilot-operated valve 160A is forced open. The first solenoid valve 130A is operatively coupled to the first pair of pilot-operated valves 156A, such that when the first solenoid valve 130A is closed, the first normally-open pilot-operated valve 158A is open and the first normally-closed pilot-operated valve 160A is closed, and when the first solenoid valve 130A is open, the first normally-open pilot-operated valve 158A is forced closed and the first normally-closed pilot-operated valve 160A is forced open. In this manner, switching the first solenoid valve 130A open and closed selectively controls the radial actuators 124A, 124B and the radial inward and outward translation of the first and second tunnel-engagement structures 120A, 120B.

The second solenoid valve 130B and the second pair of pilot-operated valves 156B function substantially similarly to the first solenoid valve 130A and the first pair of pilot-operated valves 156A, but are instead utilized to operatively couple the central hydraulic cylinder 154 to the pressurized water supply 102. For example, the second pair of pilot-operated valves 156B comprises a second normally-open pilot-operated valve 158B and a second normally-closed pilot-operated valve 160B that are substantially similar to the first normally-open and first normally-closed pilot-operated valves 158A and 160A, described above. The second normally-open pilot-operated valve 158B is configured to control rearward translation of the locomotion-system housing 111 relative to the housing segment 110 of the hydro-excavation device 100 and the second normally-closed pilot-operated valve 160B is configured to control forward translation of the locomotion-system housing 111 relative to the housing segment 110. In other words, when the normally-open pilot-operated valve 158B is open, the locomotion-system housing 111 is driven forward relative to the housing segment 111 and when the normally-closed pilot-operated valve 160B is open, the locomotion-system housing 111 is driven rearward relative to the housing segment 110. The second solenoid valve 130B is configured to selectively switch the states (e.g., open or closed) of the second normally-open pilot-operated valve 158B and the second normally-closed pilot-operated valve 160B to control the axial and linear forward and rearward translation of the locomotion-system housing 111 relative to the housing segment 110.

The first and second solenoid valves 130A, 130B and/or the first and/or second pairs of pilot-operated valves 156A, 156B may be disposed onboard the hydro-excavation device 100 (e.g., directly coupled to and supported by the hydro-excavation device 100) or may be disposed at an above-ground location. For example, the first and/or second solenoid valves 130A, 130B and/or the first and second pairs of pilot-operated valves 156A, 156B may be disposed above ground and may be operatively coupled to the locomotion system 118" via one or more external water supply lines 146 that extend from above ground through the tunnel 104 to the hydro-excavation device 100. In some examples, the first and second solenoid valves 130A, 130B are disposed above ground and the first and second pair of pilot-operated valves 156A, 156B are disposed onboard (e.g., are supported by) the hydro-excavation device 100.

Figure 6:
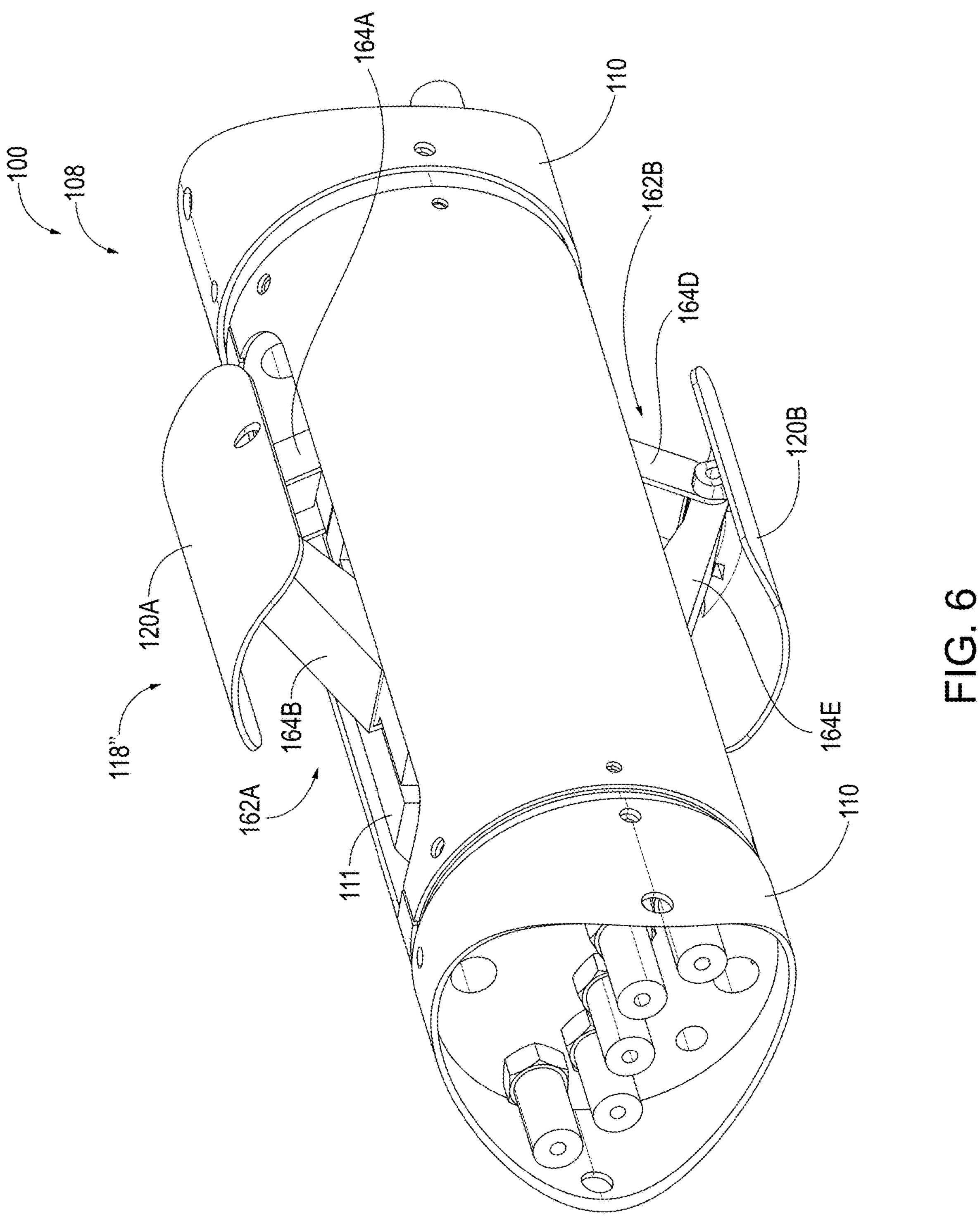
FIG. 6 is a perspective view representing an example of the locomotion system of FIG. 5 supported by a housing segment of an example hydro-excavation device.
Figure 7:
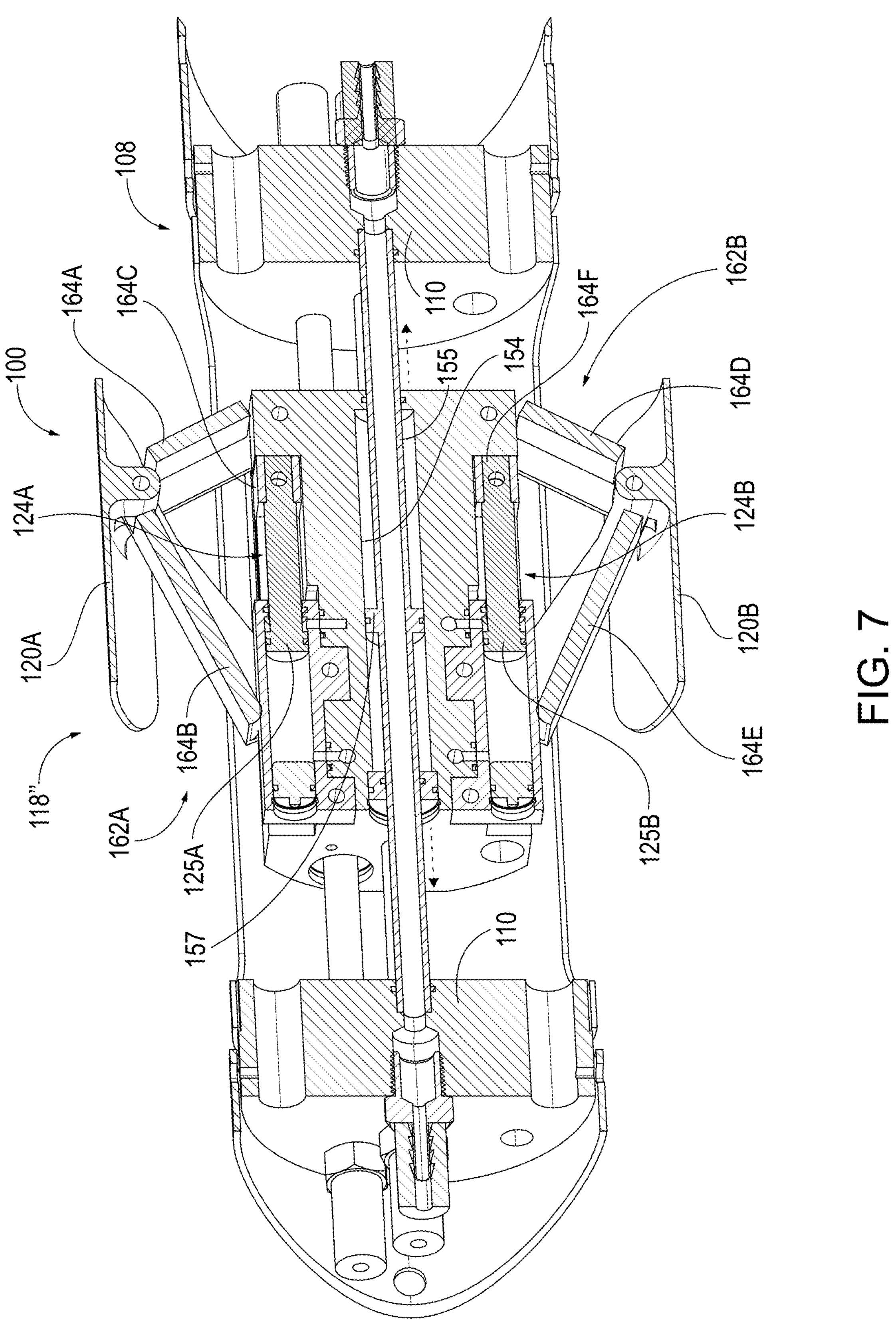
FIG. 7 is a sectional view of the locomotion system of FIGS. 5-6.

FIG. 6 illustrates a perspective view of an example of the locomotion system 118" of FIG. 5 that is supported by a housing segment 110 of the hydro-excavation device 100. FIG. 7 illustrates a sectional view of the locomotion system 118" of FIG. 6 taken along a longitudinal axis of the locomotion system 118". As shown in FIG. 7, fixed piston rod 155 extends axially through central hydraulic cylinder 154 defined by locomotion-system housing 111 and is fixed at each end to the housing segment 110 forward and rearward of the locomotion-system housing 111. The locomotion-system housing 111 is configured to slide forward and rearward on the fixed piston rod 155 relative to the housing segment 110 responsive to force applied by pressurized water received within the central hydraulic cylinder 154 on either side (e.g., forward or rearward) of the central piston 157.

Figure 8:
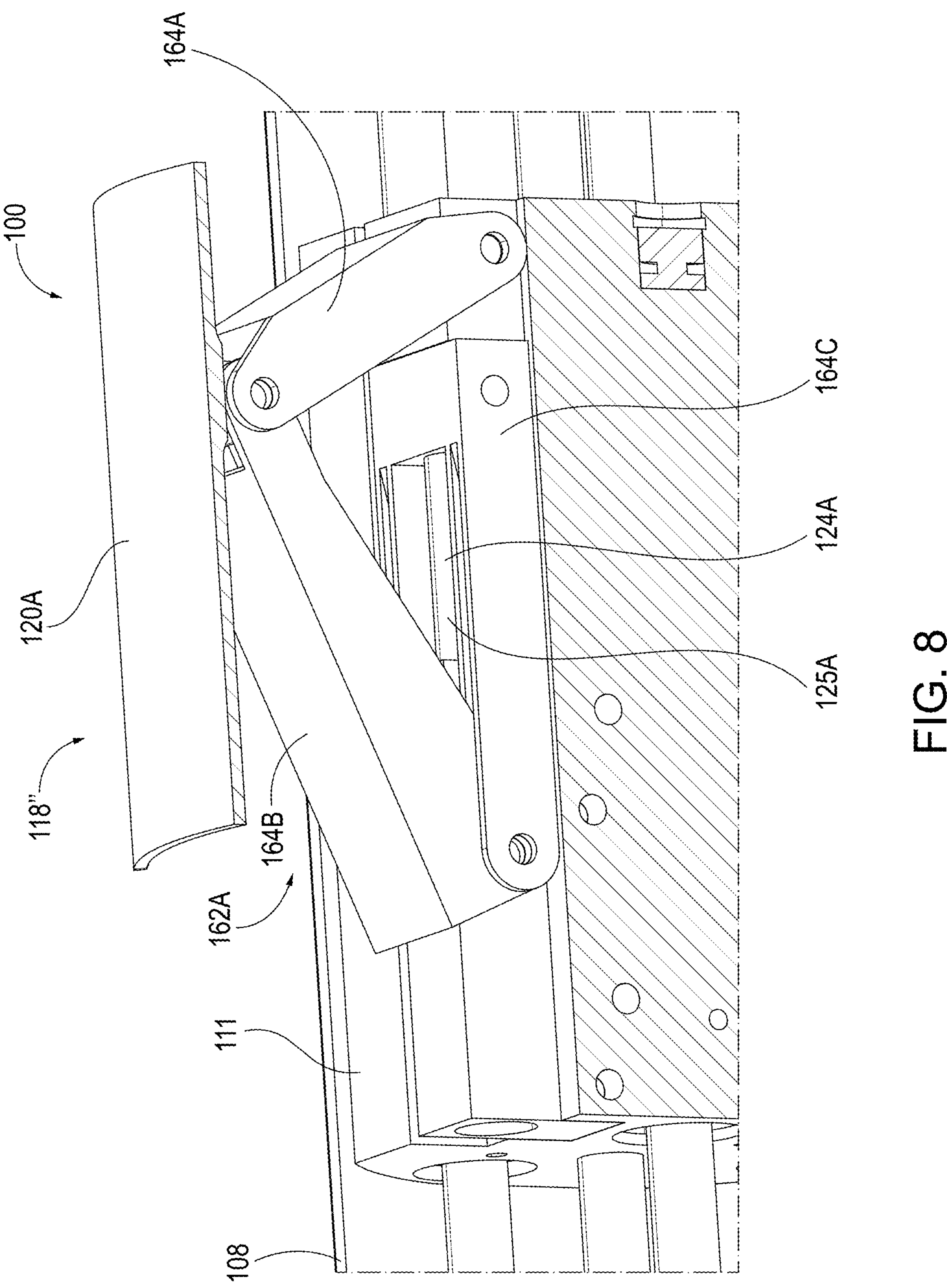
FIG. 8 is a perspective view of an example tunnel-engagement structure of the locomotion system of FIGS. 5-7.
Figure 9:
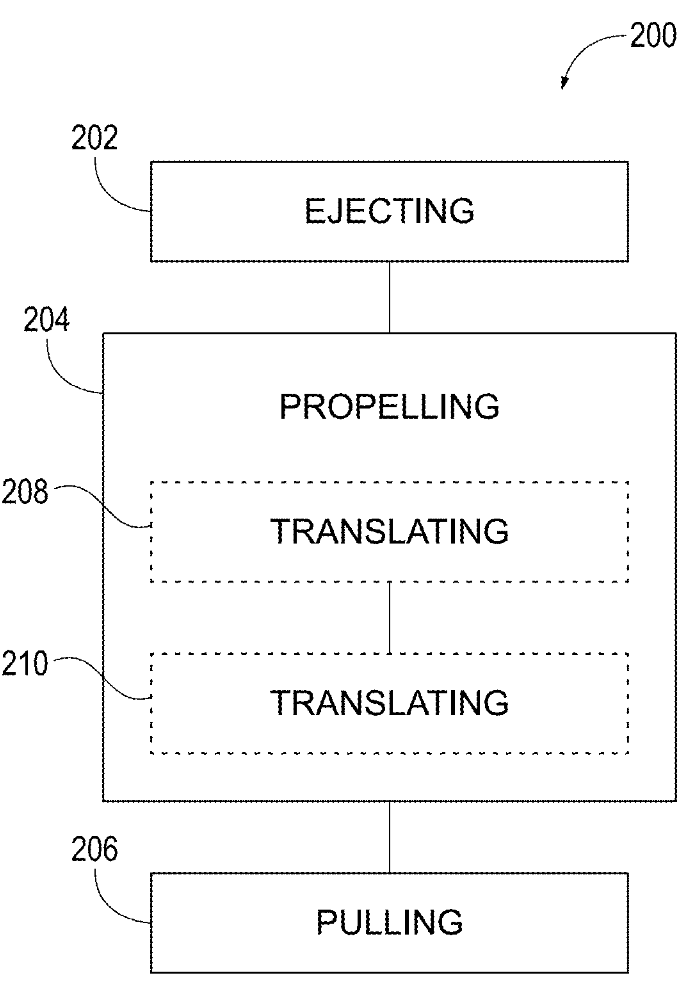
FIG. 9 is a flow chart schematically representing methods of laying a conduit in an underground tunnel utilizing a hydro-excavation device.

FIG. 8 illustrates a perspective view of the first tunnel-engagement structure 120A, the first linkage 162A, and the first radial actuator 124A of the locomotion system 118". As shown in FIG. 8, the first linkage 162A includes three links 164A-C, which operatively couple the piston 125A of the first radial actuator 124A to the first tunnel-engagement structure 120A. Extending or retracting the piston 125A adjusts a distance between the lower ends of the first link 164A and the second link 164B, which adjusts a radial inward and outward position of the first tunnel-engagement structure 120A coupled to the upper ends of the first and second links 164A, 164B. In FIG. 8, the piston 125A is shown fully expanded, such that the distance between the lower ends of the first and second links 164A, 164B is at a minimum distance and the first tunnel-engagement structure 120A is correspondingly in the expanded position, radially spaced away from the locomotion-system housing 111.

With reference to FIG. 9, methods 200 for installing a conduit in an underground tunnel utilizing a hydro-excavation device, e.g., a hydro-excavation device 100, are disclosed. Aspects of hydro-excavation devices 100 may be utilized in the method steps described below. Where appropriate, reference may be made to components and systems that may be used in carrying out each step. These references are for illustration, and are not intended to limit the possible ways of carrying out any particular step of the method.

FIG. 9 may not recite the complete process or all steps of methods 200. Although various steps of methods 200 are described below and depicted in FIG. 9, the steps need not necessarily all be performed, and in some cases may be performed simultaneously or in a different order than the order shown.

As represented in FIG. 9, methods 200 comprise at least ejecting 202 pressurized water forward of a hydro-excavation device 100 to excavate a tunnel 104, propelling 204 the hydro-excavation device 100 forward into the underground tunnel 104 while ejecting 202 the pressurized water, and pulling 206 the conduit 106 behind the hydro-excavation device 100 into the underground tunnel 104 while ejecting 202 the pressurized water and propelling 204 the hydro-excavation device 100. In other words, the ejecting 202, the propelling 204, and the pulling 206 are performed simultaneously.

In some examples, the propelling 204 comprises translating 208 at least one tunnel-engagement structure 120 of the hydro-excavation device 100 radially away from a housing 108 of the hydro-excavation device 100, such that the at least one tunnel engagement structure 120 contacts an inner wall 148 of the tunnel 104. In some examples, the propelling 204 further comprises translating 210 the at least one tunnel engagement structure 120 rearward relative to the housing 108, while the at least one tunnel-engagement structure 120 contacts the inner wall 148 of the tunnel 104.

This section describes additional aspects and features of hydro-excavation devices, presented without limitation as a series of paragraphs, some or all of which may be alphanumerically designated for clarity and efficiency. Each of these paragraphs can be combined with one or more other paragraphs, and/or with disclosure from elsewhere in this application, including any attached Appendices, in any suitable manner. Some of the paragraphs below may expressly refer to and further limit other paragraphs, providing without limitation examples of some of the suitable combinations.

A. A hydro-excavation device (100) configured to be operatively connected to a pressurized water supply (102) and to excavate a tunnel (104), the hydro-excavation device (100) comprising:

a housing (108) comprising a plurality of housing segments (110) including a forward-most housing segment (112);

a nozzle (116) supported by the forward-most housing segment (112), wherein the nozzle (116) is configured to be operatively connected to the pressurized water supply (102) and to eject water forward of the hydro-excavation device (100) to excavate the tunnel (104); and a locomotion system (118) operatively supported by the housing (108), wherein the locomotion system (118) is configured to propel the hydro-excavation device (100) through the tunnel (104).

A1. The hydro-excavation device (100) of paragraph A, wherein the locomotion system (118) comprises at least one tunnel-engagement structure (120) and at least one actuator (122).

A1.1. The hydro-excavation device (100) of paragraph A1, wherein the at least one actuator (122) is configured to translate the at least one tunnel-engagement structure (120) radially away from and toward the housing (108) between an expanded position and a contracted position, and linearly forward and rearward relative to the housing (108) to move the hydro-excavation device (100) through the tunnel (104).

A1.1.1. The hydro-excavation device of paragraph A1.1, wherein when the at least one tunnel-engagement structure (120) is in the expanded position, the at least one tunnel-engagement structure (120) is configured to engage an inner wall (148) of the tunnel (104), and when the at least one tunnel-engagement structure (120) is in the contracted position, the at least one tunnel-engagement structure (120) is configured to be disengaged from the inner wall (148) of the tunnel (104).

A1.1.1.1. The hydro-excavation device of paragraph A1.1.1, wherein the at least one actuator (122) is configured to translate the at least one tunnel-engagement structure (120) rearward relative to the housing (108) when the at least one tunnel-engagement structure (120) is in the expanded position, and wherein the at least one actuator (122) is configured to translate the at least one tunnel-engagement structure (120) forward relative to the housing (108) when the at least one tunnel-engagement structure (120) is in the contracted position.

A1.2. The hydro-excavation device (100) of any one of paragraphs A1-A1.1.1.1, wherein the at least one tunnel-engagement structure (120) comprises a pair of tunnel-engagement structures (120A, 120B) each configured to be operatively translated by the at least one actuator (122).

A2. The hydro-excavation device (100) of any one of paragraphs A1-A1.2, wherein the at least one actuator (122) comprises:

at least one radial actuator (124) configured to translate the at least one tunnel-engagement structure (120) radially away from and toward the housing (108) between a/the expanded position and a/the contracted position; and at least one axial actuator (126) configured to translate the at least one tunnel-engagement structure (120) linearly forward and rearward relative to the housing (108).

A2.1. The hydro-excavation device (100) of paragraph A2, wherein the locomotion system (118) further comprises a locomotion-system housing (111), wherein the at least one radial actuator (124), the at least one axial actuator (126), and the at least one tunnel-engagement structure (120) are each operatively coupled to the locomotion-system housing (111).

A2.1.1. The hydro-excavation device (100) of paragraph A2.1, wherein the at least one radial actuator (124) is configured to translate the at least one tunnel-engagement structure (120) radially away from and toward the locomotion-system housing (111) and the housing (108), and wherein the at least one axial actuator (126) is configured to translate the locomotion-system housing (111) linearly forward and rearward relative to the housing (108) in order to translate the at least one tunnel-engagement structure (120) forward and rearward relative to the housing (108).

A2.1.1.1. The hydro-excavation device (100) of paragraph A2.1.1, wherein the at least one axial actuator (126) comprises a fixed piston rod (155) fixed at each end to the housing (108) and a central hydraulic cylinder (154) defined by and extending longitudinally through the locomotion-system housing (111), wherein the fixed piston rod (155) is operatively received within the central hydraulic cylinder (154), such that the locomotion-system housing (111) is configured to slide linearly forward and rearward on the fixed piston rod (155) relative to the housing (108).

A2.2. The hydro-excavation device (100) of any one of paragraphs A2-A2.1.1.1, further comprising a linkage (162) operatively coupling the at least one radial actuator (124) to the at least one tunnel-engagement structure (120).

A2.2.1. The hydro-excavation device (100) of paragraph A2.2, wherein the linkage (162) is configured to convert linear translation of the at least one radial actuator (124) into radial inward and outward translation of the at least one tunnel-engagement structure (120) relative to the housing (108) between the expanded position and the contracted position.

A2.3. The hydro-excavation device (100) of any one of paragraphs A2-A2.2.1, wherein the at least one radial actuator (124) and the at least one axial actuator (126) each comprise hydraulic actuators (128) configured to be actuated by the pressurized water received from the pressurized water supply (102).

A3. The hydro-excavation device (100) of any one of paragraphs A1-A2.3, further comprising at least one solenoid valve (130) operatively coupled to the at least one actuator (122) and the pressurized water supply (102).

A3.1. The hydro-excavation device (100) of paragraph A3, wherein the at least one solenoid valve (130) is configured to selectively control water received from the pressurized water supply (102) to actuate the at least one actuator (122).

A3.2. The hydro-excavation device (100) of paragraph A3 or A3.1 when depending from any one of paragraphs A2-A2.3, wherein the at least one solenoid valve (130) comprises a first solenoid valve (130A) operatively connected to the at least one radial actuator (124A-D), wherein the first solenoid valve (130A) is configured to selectively control water received from the pressurized water supply (102) to actuate the at least one radial actuator (124A-D).

A3.2.1. The hydro-excavation device (100) of paragraph A3.2, wherein the at least one solenoid valve (130) comprises a second solenoid valve (130B) and a third solenoid valve (130C), each operatively connected to the at least one axial actuator (126), wherein the second solenoid valve (130B) and the third solenoid valve (130C) are each configured to selectively control water received from the pressurized water supply (102) to actuate the at least one axial actuator (126).

A4. The hydro-excavation device (100) of any one of paragraphs A2-A2.3, further comprising a first solenoid valve (130A) and a first pair of pilot-operated valves (156A) operatively coupling the at least one radial actuator (124) to the pressurized water supply (102), wherein the first pair of pilot-operated valves (156A) are configured to selectively control water received from the pressurized water supply (102) to extend or retract the at least one radial actuator (124).

A4.1. The hydro-excavation device (100) of paragraph A4, wherein the first pair of pilot-operated valves (156A)

comprises a first normally-closed pilot-operated valve (160A) and a first normally-open pilot-operated valve (158A), wherein the first normally-closed pilot-operated valve (160A) is configured to be closed when the first normally-open pilot-operated valve (158A) is open, and wherein the first normally-closed pilot-operated valve (160A) is configured to be open when the first normally-open pilot-operated valve (158A) is closed.

A4.1.1. The hydro-excavation device (100) of paragraph A4.1, wherein when the first normally-closed pilot-operated valve (160A) is closed and the first normally-open pilot-operated valve (158A) is open, the at least one radial actuator (124A, 124B) is configured to be extended, and when the normally-closed pilot-operated valve (160A) is open and the normally-open pilot operated valve (158A) is closed, the at least one radial actuator (124A, 124B) is configured to be retracted.

A4.1.1.1. The hydro-excavation device (100) of paragraph A4.1.1, wherein the at least one radial actuator (124) is operatively coupled to the at least one tunnel-engagement structure (120), such that when the at least one radial actuator (124) is retracted, the at least one tunnel-engagement structure (120) is in the contracted position, and when the at least one radial actuator (124) is expanded, the at least one tunnel-engagement structure (120) is in the expanded position.

A4.1.2. The hydro-excavation device (100) of any one of paragraphs A4.1-A4.1.1.1, wherein the first solenoid valve (130A) is configured to be selectively opened and closed, and wherein the first solenoid valve (130A) is operatively coupled to the first pair of pilot-operated valves (156A) in order to selectively switch the states of the first normally-open pilot-operated valve (158A) and the first normally-closed pilot-operated valve (160A).

A4.1.2.1. The hydro-excavation device (100) of paragraph A4.1.2, wherein when the first solenoid valve (130A) is closed, the first normally-open pilot-operated valve (158A) is open and the first normally-closed pilot-operated valve (160A) is closed, and when the first solenoid valve (130A) is open, the first normally open pilot-operated valve (158A) is forced closed and the first normally-closed pilot-operated valve (160A) is forced open.

A4.2. The hydro-excavation device (100) of any one of paragraphs A4-A4.1.2.1, further comprising a second solenoid valve (130B) and a second pair of pilot-operated valves (156B) operatively coupling the at least one axial actuator (126) to the pressurized water supply (102), wherein the second pair of pilot-operated valves (156B) are configured to selectively control water received from the pressurized water supply (102) to actuate the at least one axial actuator (126).

A4.2.1. The hydro-excavation device (100) of paragraph A4.2, wherein the second pair of pilot-operated valves (156B) comprises a second normally-closed pilot-operated valve (160B) and a second normally-open pilot-operated valve (158B), wherein the second normally-closed pilot-operated valve (160B) is configured to be closed when the second normally-open pilot-operated valve (158B) is open, and wherein the second normally-closed pilot-operated valve (160B) is configured to be open when the second normally-open pilot-operated valve (158B) is closed.

A4.2.1.1. The hydro-excavation device (100) of paragraph A4.2.1, wherein when the second normally-closed pilot operated valve (160B) is closed and the second normally-open pilot-operated valve (158B) is open, the at least one axial actuator (126) is configured to translate the at least one tunnel-engagement structure (120) linearly rearward relative to the housing (108), and when the second normally-closed pilot operated valve (160B) is open and the second normally-open pilot operated valve (158B) is closed, the at least one axial actuator (126) is configured to translate the at least one tunnel-engagement structure (120) linearly forward relative to the housing (108).

A4.2.1.2. The hydro-excavation device of paragraph 4.2.1 or A4.2.1.1, wherein the second solenoid valve (130B) is configured to be selectively opened and closed, wherein when the second solenoid valve (130B) is closed, the second normally-open pilot-operated valve (158B) is open and the second normally-closed pilot-operated valve (160B) is closed, and when the second solenoid valve (130B) is open, the second normally-open pilot-operated valve (158B) is forced closed and the second normally-closed pilot-operated valve (160B) is forced open.

A5. The hydro-excavation device (100) of any one of paragraphs A-A4.2.1.2, wherein the plurality of housing segments (110) further comprises a rearward-most housing segment (114), wherein the rearward-most housing segment (114) is configured to be selectively coupled to and decoupled from a conduit (106), wherein the hydro-excavation device (100) is configured to pull the conduit (106) into the tunnel (104).

A5.1. The hydro-excavation device (100) of paragraph A5, wherein the conduit (106) comprises any suitable conduit and/or one or more direct burial cables or utility lines.

A6. The hydro-excavation device (100) of any one of paragraphs A-A5.1, wherein the plurality of housing segments (110) are articulated relative to each other.

A7. The hydro-excavation device (100) of any one of paragraphs A-A6, further comprising:

an articulable joint (132) connecting the forward-most housing segment (112) to a second segment (134) of the plurality of housing segments (110), wherein the articulable joint (132) is configured to permit rotational motion of the forward-most housing segment (112) relative to the second segment (134).

A7.1. The hydro-excavation device of paragraph A7, further comprising a joint actuator (136) operatively coupled to the articulable joint (132) to control the rotational motion of the forward-most housing segment (112) relative to the second segment (134).

A7.1.1. The hydro-excavation device of paragraph A7.1, further comprising:

an electronic controller (131) operatively coupled to the joint actuator (136), the electronic controller (131) including processing logic configured to selectively control the joint actuator (136).

A7.1.2. The hydro-excavation device of paragraph A7.1 or A7.1.1, further comprising:

a radio receiver (138) housed in one of the plurality of housing segments (110), wherein the radio receiver (138) is configured to receive remote control signals to control the joint actuator (136).

A8. The hydro-excavation device of any one of paragraphs A-A7.1.2, further comprising a respective articulable joint (140) connecting each of the plurality of housing segments (110), such that the plurality of housing segments (110) are articulated relative to each other.

A9. The hydro-excavation device (100) of any one of paragraphs A-A8, wherein the nozzle (116) comprises one or more fixed jets (142), each configured to eject water forward of the device (100).

A9.1. The hydro-excavation device (100) of paragraph A9, wherein the nozzle (116) is configured to rotate about a longitudinal axis (144) of the hydro-excavation device (100), such that the fixed jets (142) are rotated about the longitudinal axis (144).

A10. The hydro-excavation device (100) of any one of paragraphs A-A9.1, further comprising:

an internal water supply line (152) extending through the plurality of housing segments (110) from a/the rearward-most housing segment (114) to the forward-most housing segment (112), wherein the internal water supply line (152) is configured to receive water from an external water supply line (146) of the pressurized water supply (102).

A11. The hydro-excavation device (100) of any one of paragraphs A-A10, further comprising:

at least one sensor (150) configured to detect obstructions in front of the hydro-excavation device (100).

B. A method (200) of installing a conduit (106) in an underground tunnel (104) utilizing a hydro-excavation device (100), the method (200) comprising:

ejecting (202) pressurized water forward of the hydro-excavation device (100) to excavate the underground tunnel (104) by eroding debris in front of the hydro-excavation device (100);

propelling (204) the hydro-excavation device (100) forward into the underground tunnel (104), while ejecting (202) the pressurized water; and pulling (206) the conduit (106) behind the device (100) into the underground tunnel (104), while ejecting (202) the pressurized water and propelling (204) the hydro-excavation device (100).

B1. The method (200) of paragraph B, wherein the propelling (204) comprises:

translating (208) at least one tunnel-engagement structure (120) of the hydro-excavation device (100) radially away from a housing (108) of the hydro-excavation device (100) to contact an inner wall (148) of the underground tunnel (104); and translating (210) the at least one tunnel-engagement structure (120) rearward relative to the housing (108), while the at least one tunnel-engagement structure (120) contacts the inner wall (148) of the underground tunnel (104).

The different embodiments and examples of the hydro-excavation devices for laying conduit underground described herein provide several advantages over known solutions for laying conduit underground. For example, illustrative embodiments and examples described herein allow a hydro-excavation device configured to utilize pressurized water to excavate a tunnel and to pull a conduit into the tunnel behind the device. By using pressurized water to excavate the tunnel, the hydro-excavation device prevents damage to existing utilities that the device may encounter underground, as the pressurized water is not capable of damaging the existing utilities. Furthermore, the hydro-excavation devices described herein facilitate a trenchless and non-invasive method of installing the conduit underground.

Additionally, and among other benefits, illustrative embodiments and examples described herein allow a hydro-excavation device that comprises a locomotion system configured to facilitate the device moving itself through the tunnel excavated by the device. The locomotion system is driven utilizing the pressurized water that is also utilized by the device to excavate the tunnel. This results in higher efficacy and facilitates the hydro-excavation devices herein laying conduit along longer utility paths (e.g., up to 0.5 miles) than is possible using conventional methods.

Additionally, and among other benefits, illustrative embodiments and examples described herein allow a hydro-excavation device that is configured to be turned and maneuvered to avoid underground obstructions in the path of the device. As a result, the hydro-excavation device is configured to be utilized to install conduit underground, without damaging the existing conduit or piping already underground.

No known system or device can perform these functions. However, not all embodiments and examples described herein provide the same advantages or the same degree of advantage.

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A hydro-excavation device configured to be operatively connected to a pressurized water supply and to excavate a tunnel, the hydro-excavation device comprising:

a housing comprising a plurality of housing segments comprising a forward-most housing segment;

a nozzle supported by the forward-most housing segment, wherein the nozzle is configured to be operatively connected to the pressurized water supply and to eject water forward of the hydro-excavation device to excavate the tunnel; and a locomotion system operatively supported by the housing, wherein the locomotion system is configured to propel the hydro-excavation device through the tunnel, wherein the locomotion system comprises:

at least one tunnel-engagement structure; and at least one actuator, wherein the at least one actuator is configured to translate the at least one tunnel-engagement structure radially away from and toward the housing between an expanded position and a contracted position, and linearly forward and rearward relative to the housing to move the hydro-excavation device through the tunnel.

2. The hydro-excavation device of claim 1, wherein the at least one actuator comprises:

at least one radial actuator configured to translate the at least one tunnel-engagement structure radially away from and toward the housing between the expanded position and the contracted position; and at least one axial actuator configured to translate the at least one tunnel-engagement structure linearly forward and rearward relative to the housing.

3. The hydro-excavation device of claim 2, wherein the locomotion system further comprises a locomotion-system housing, wherein the at least one radial actuator, the at least one axial actuator, and the at least one tunnel-engagement structure are each operatively coupled to the locomotion-system housing.

4. The hydro-excavation device of claim 3, wherein the at least one radial actuator is configured to translate the at least one tunnel-engagement structure radially away from and toward the locomotion-system housing and the housing, and wherein the at least one axial actuator is configured to translate the locomotion-system housing linearly forward and rearward relative to the housing in order to translate the at least one tunnel-engagement structure forward and rearward relative to the housing.

5. The hydro-excavation device of claim 4, wherein the at least one axial actuator comprises a fixed piston rod fixed at each end to the housing and a central hydraulic cylinder defined by and extending longitudinally through the locomotion-system housing, wherein the fixed piston rod is operatively received within the central hydraulic cylinder, such that the locomotion-system housing is configured to slide linearly forward and rearward on the fixed piston rod relative to the housing.

6. The hydro-excavation device of claim 2, further comprising a first solenoid valve and a first pair of pilot-operated valves, wherein the first solenoid valve and the first pair of pilot-operated valves are configured to selectively control water received from the pressurized water supply to extend or retract the at least one radial actuator.

7. The hydro-excavation device of claim 6, further comprising a second solenoid valve and a second pair of pilot-operated valves, wherein the second solenoid valve and the second pair of pilot-operated valves are configured to selectively control water received from the pressurized water supply to selectively actuate the at least one axial actuator.

8. The hydro-excavation device of claim 6, wherein the first pair of pilot-operated valves comprises a first normally-closed pilot-operated valve and a first normally-open pilot-operated valve, wherein the first normally-closed pilot-operated valve is configured to be closed when the first normally-open pilot-operated valve is open, and wherein the first normally-closed pilot-operated valve is configured to be open when the first normally-open pilot-operated valve is closed;

wherein when the first normally-closed pilot-operated valve is closed and the first normally-open pilot-operated valve is open, the at least one radial actuator is configured to be extended, and when the first normally-closed pilot-operated valve is open and the first normally-open pilot-operated valve is closed, the at least one radial actuator is configured to be retracted; and wherein the at least one radial actuator is operatively coupled to the at least one tunnel-engagement structure, such that when the at least one radial actuator is retracted, the at least one tunnel-engagement structure is in the contracted position, and when the at least one radial actuator is expanded, the at least one tunnel-engagement structure is in the expanded position.

9. The hydro-excavation device of claim 2, further comprising a linkage operatively coupling the at least one radial actuator to the at least one tunnel-engagement structure, wherein the linkage is configured to convert linear translation of the at least one radial actuator into radial inward and outward translation of the at least one tunnel-engagement structure relative to the housing between the expanded position and the contracted position.

10. The hydro-excavation device of claim 1, further comprising at least one solenoid valve operatively coupled to the at least one actuator and the pressurized water supply, wherein the at least one solenoid valve is configured to selectively control water received from the pressurized water supply to selectively actuate the at least one actuator.

11. The hydro-excavation device of claim 1, wherein the plurality of housing segments further comprises a rearward-most housing segment, wherein the rearward-most housing segment is configured to be selectively coupled to and decoupled from a conduit, and wherein the hydro-excavation device is configured to pull the conduit into the tunnel.

12. The hydro-excavation device of claim 1, wherein the plurality of housing segments are articulated relative to each other.

13. The hydro-excavation device of claim 1, further comprising:

a rotatable joint connecting the forward-most housing segment to a second segment of the plurality of housing segments, wherein the rotatable joint is configured to permit rotational motion of the forward-most housing segment relative to the second segment.

14. The hydro-excavation device of claim 13, further comprising a joint actuator operatively coupled to the rotatable joint to control the rotational motion of the forward-most housing segment relative to the second segment.

15. The hydro-excavation device of claim 14, further comprising:

an electronic controller operatively coupled to the joint actuator, wherein the electronic controller is configured to selectively actuate the joint actuator to control the rotational motion of the forward-most housing segment relative to the second segment.

16. The hydro-excavation device of claim 1, further comprising a respective articulable joint connecting each of the plurality of housing segments, such that the plurality of housing segments are articulated relative to each other.

17. The hydro-excavation device of claim 1, wherein the nozzle comprises one or more fixed jets, each configured to eject water forward of the hydro-excavation device.

18. The hydro-excavation device of claim 17, wherein the nozzle is configured to rotate about a longitudinal axis of the hydro-excavation device, such that the fixed jets are rotated about the longitudinal axis.

19. The hydro-excavation device of claim 1, further comprising:

an internal water supply line extending through the plurality of housing segments from a rearward-most housing segment of the plurality of housing segments to the forward-most housing segment, wherein the internal water supply line is configured to receive water from an external water supply line of the pressurized water supply.

20. A method of installing a conduit utilizing the hydro-excavation device of claim 1, the method comprising:

ejecting pressurized water forward of the hydro-excavation device from the nozzle to excavate the tunnel by eroding debris in front of the hydro-excavation device;

propelling the hydro-excavation device forward into the tunnel, while ejecting the pressurized water, wherein the propelling comprises:

translating the at least one tunnel-engagement structure of the hydro-excavation device radially away from the housing of the hydro-excavation device to contact an inner wall of the tunnel; and translating the at least one tunnel-engagement structure rearward relative to the housing, while the at least one tunnel-engagement structure contacts the inner wall of the tunnel; and pulling the conduit behind the hydro-excavation device into the tunnel, while ejecting the pressurized water and propelling the hydro-excavation device.

* * * * *